(12) United States Patent
Babbitt et al.

(10) Patent No.: US 12,110,895 B2
(45) Date of Patent: Oct. 8, 2024

(54) SUBSEA PUMPING APPARATUSES AND RELATED METHODS

(71) Applicant: Transocean Innovation Labs, Ltd., George Town (KY)

(72) Inventors: Guy Robert Babbitt, Fort Collins, CO (US); John Matthew Dalton, Missouri City, TX (US); Luis R. Pereira, Katy, TX (US); James Edward Kersey, Loveland, CO (US)

(73) Assignee: TRANSOCEAN INNOVATION LABS LTD, George Town Grand Cayman (KY)

( * ) Notice: Subject to any disclaimer, the term of this patent is extended or adjusted under 35 U.S.C. 154(b) by 0 days.

(21) Appl. No.: 17/729,556

(22) Filed: Apr. 26, 2022

(65) Prior Publication Data
US 2023/0079573 A1   Mar. 16, 2023

Related U.S. Application Data

(63) Continuation of application No. 14/461,342, filed on Aug. 15, 2014, now Pat. No. 11,339,788.
(Continued)

(51) Int. Cl.
*F04D 13/08* (2006.01)
*E21B 41/00* (2006.01)
(Continued)

(52) U.S. Cl.
CPC .......... *F04D 13/08* (2013.01); *E21B 41/0007* (2013.01); *F04B 17/03* (2013.01);
(Continued)

(58) Field of Classification Search
CPC .......... F04B 23/02; F04B 23/04; F04B 47/06; F04B 49/22; F04D 13/08; F04D 13/12; E21B 41/0007
See application file for complete search history.

(56) References Cited

U.S. PATENT DOCUMENTS 3,338,302 A * 8/1967 Hubby ................ E21B 33/0355
                                                  166/351
3,366,173 A * 1/1968 Mcintosh .............. E21B 43/017
                                                  166/356
(Continued)

FOREIGN PATENT DOCUMENTS

CN    102678075 A    9/2012
JP    S55099379 A    7/1980
(Continued)

OTHER PUBLICATIONS

Fourth Office Action issued by The Chinese Patent Office for Application No. 201480056966.5, dated Jul. 9, 2021, 7 pages including English Translation.
(Continued)

*Primary Examiner* — Christopher S Bobish
(74) *Attorney, Agent, or Firm* — Panitch Schwarze Belisario & Nadel LLP

(57) ABSTRACT

This disclosure includes subsea pumping apparatuses and related methods. Some apparatuses include one or more subsea pumps, each having an inlet and an outlet, and one or more motors, each configured to actuate at least one pump to communicate a hydraulic fluid from the inlet to the outlet, where the subsea pumping apparatus is configured to be in fluid communication with a hydraulically actuated device of a blowout preventer. Some subsea pumping apparatuses include one or more of: a desalination system configured to produce at least a portion of the hydraulic fluid; one or more valves, each configured to selectively route hydraulic fluid from an outlet of a pump to, for example, a subsea environment, a reservoir, and/or the inlet of the pump; and a reservoir configured to store at least a portion of the hydraulic fluid. Some apparatuses are configured to be directly coupled to the hydraulically actuated device.

13 Claims, 12 Drawing Sheets

Related U.S. Application Data

(60) Provisional application No. 61/866,483, filed on Aug. 15, 2013.

(51) Int. Cl.

| | | |
|---|---|---|
| *F04B 17/03* | (2006.01) | |
| *F04B 23/02* | (2006.01) | |
| *F04B 23/04* | (2006.01) | |
| *F04B 47/06* | (2006.01) | |
| *F04B 49/22* | (2006.01) | |
| *F04D 13/12* | (2006.01) | |
| *C02F 1/44* | (2023.01) | |
| *C02F 103/08* | (2006.01) | |

(52) U.S. Cl.
CPC .............. *F04B 23/02* (2013.01); *F04B 23/04* (2013.01); *F04B 47/06* (2013.01); *F04B 49/22* (2013.01); *F04D 13/12* (2013.01); *C02F 1/441* (2013.01); *C02F 2103/08* (2013.01)

(56) References Cited

U.S. PATENT DOCUMENTS

| | | | | | |
|---|---|---|---|---|---|
| 3,461,957 | A * | 8/1969 | West | ................... | E21B 33/0375 166/368 |
| 3,750,406 | A * | 8/1973 | Verlinde | ................. | F16H 61/42 60/443 |
| 4,294,284 | A * | 10/1981 | Herd | ..................... | F16K 3/0254 251/327 |
| 4,589,434 | A * | 5/1986 | Kelley | ..................... | F17D 3/14 137/236.1 |
| 4,616,981 | A * | 10/1986 | Simmons | ................ | F04B 47/08 417/390 |
| 4,646,517 | A * | 3/1987 | Wright | .................... | F04B 47/04 91/275 |
| 4,871,302 | A * | 10/1989 | Clardy | ................... | F01L 25/063 417/404 |
| 4,955,195 | A * | 9/1990 | Jones | ...................... | E21B 34/16 91/32 |
| 5,042,149 | A * | 8/1991 | Holland | .................. | F04B 47/08 29/469 |
| 5,353,870 | A * | 10/1994 | Harris | ................... | E21B 43/127 417/400 |
| 6,032,742 | A * | 3/2000 | Tomlin | .................. | E21B 33/064 166/387 |
| 7,415,937 | B2 * | 8/2008 | Giesler | ................... | B63G 8/00 114/312 |
| 7,424,917 | B2 * | 9/2008 | Martin | ................... | B63C 11/52 166/373 |
| 7,600,567 | B2 * | 10/2009 | Christopher | ............ | E21B 43/36 166/266 |
| 7,950,472 | B2 * | 5/2011 | DiFoggio | ................ | E21B 47/06 175/48 |
| 7,979,240 | B2 * | 7/2011 | Fielder | .................. | E21B 47/008 702/14 |
| 8,083,501 | B2 * | 12/2011 | Scarsdale | ............ | E21B 41/0007 417/423.15 |
| 8,382,457 | B2 * | 2/2013 | Wilson | .................... | F04B 23/00 417/423.15 |
| 8,464,525 | B2 * | 6/2013 | Springett | ............ | E21B 33/0355 91/193 |
| 8,500,419 | B2 * | 8/2013 | Scarsdale | .............. | F04D 13/086 417/423.5 |
| 8,529,770 | B2 * | 9/2013 | Yencho | ................... | C02F 1/325 422/186 |
| 8,893,775 | B2 * | 11/2014 | Bjoroy | ................... | E21B 43/01 166/66.4 |
| 8,955,595 | B2 * | 2/2015 | Emecheta | .......... | E21B 33/0355 60/415 |
| 8,955,959 | B2 | 2/2015 | Teshigawara et al. | | |
| 2003/0010094 | A1 * | 1/2003 | Tucker | ...................... | F16L 1/26 73/49.5 |
| 2003/0178200 | A1 * | 9/2003 | Fox | ......................... | E21B 7/124 166/344 |
| 2010/0299119 | A1 * | 11/2010 | Erikson | .............. | G05B 19/4184 702/184 |
| 2011/0114329 | A1 * | 5/2011 | Emecheta | .......... | E21B 33/0355 60/415 |
| 2012/0234550 | A1 * | 9/2012 | Dietz | .................... | E21B 21/08 166/344 |
| 2012/0279720 | A1 | 11/2012 | Whitby et al. | | |
| 2012/0292051 | A1 | 11/2012 | Wetzel et al. | | |
| 2014/0131049 | A1 | 5/2014 | Bourgeau | | |

FOREIGN PATENT DOCUMENTS

| | | |
|---|---|---|
| WO | 2008074995 A1 | 6/2008 |
| WO | 2012120307 A2 | 9/2012 |
| WO | 2012122159 A2 | 9/2012 |
| WO | 2012176170 A1 | 12/2012 |

OTHER PUBLICATIONS

Office Action issued by the Candaian Patent Office for Application No. 2,920,676, dated Apr. 7, 2021, 4 pages.

Office Action issued by the Australian Patent Office for Application No. 2020204294, dated Mar. 31, 2021, 4 pages.

Office Action issued by the Brazilian Patent Office for Application No. BR112016003170.9, dated May 19, 2020, 7 pages including English Tranlation.

Extended European Search Report issued by the European Patent Office for Application No. 20156583.5, dated Sep. 21, 2020, 9 pages.

Office Action issued by the Canadian Patent Office for Application No. 2,920,676, dated Oct. 22, 2020, 4 pages.

Second Office Action issued by the Mexican Patent Office for Application No. MX/A/2016/002033, dated Aug. 28, 2020, 5 pages (Non-English).

Office Action issued by the Korean Patent Office for Application No. 10-2016-7006678, dated Jan. 18, 2021, 6 pages including English Translation.

Office Action issued by the Chinese Patent Office for Application No. 201480056966.5, dated Feb. 5, 2021, 12 pages including English Translation.

Office Action issued by the Mexican Patent Office for Application No. MX/A/2016/002033, dated Jul. 15, 2019 (rec'd Sep. 3, 2019) 6 pages (Non-English).

Written Opinion issued in Singapore Application No. 11201601043V, dated May 2, 2017, 13 pages.

Third Office Action issued by the Chinese Patent Office for Application No. 201480056966.5, dated Mar. 20, 2020, 21 pages including English Translation.

Second Office Action issued by the Chinese Patent Office for Application No. 201480056966.5, dated Apr. 3, 2019 (rec'd May 9, 2019): 18 pages including English Translation.

Penultimate Office Action issued by the Japanese Patent Office for Application No. 2016-534881, dated May 21, 2019 (rec'd Jun. 11, 2019, 13S pages including English Translation.

First Examination Report issued by the Australian Patent Office for Application No. 2018220095, dated Jun. 27, 2019, 3 pages.

Extended European Search Report issued by the European Patent Office for Application No. 14836069.6, dated Apr. 24, 2017, 11 pages.

Office Action issued by the Chinese Patent Office for Application No. 201480056966.5, dated May 17, 2018, rec'd Sep. 7, 2018, 5 pages non-English and 8 page English Translation.

Office Action issued by the European Patent Office for Application No. 14836069.6, dated Sep. 7, 2018, rec'd Sep. 10, 2018, 4 pages.

International Search Report and Written Opinion in International Application No. PCT/US2014/051378 dated Jan. 22, 2015.

(56) References Cited

OTHER PUBLICATIONS

Examination report dated Jun. 1, 2023 in AU Application No. 2022201534.
Office Action issued Feb. 22, 2024 Canadian Application No. 3,158,697.

* cited by examiner

SUBSEA PUMPING APPARATUSES AND RELATED METHODS

CROSS-REFERENCE TO RELATED APPLICATIONS

This application is a Continuation of application Ser. No. 14/461,342, filed Aug. 15, 2014 and issued May 24, 2022 as U.S. Pat. No. 11,339,788, which claims priority to U.S. Provisional Patent Application No. 61/866,483 filed Aug. 15, 2013, the disclosures of each of which are incorporated herein by reference in their entireties.

BACKGROUND

1. Field of Invention

The present invention relates generally to subsea pumping, and more specifically, but not by way of limitation, to subsea pumping apparatuses configured to, for example, provide hydraulic fluid to a subsea hydraulically actuated device (e.g., of a blowout preventer).

2. Description of Related Art

A blowout preventer is a mechanical device, usually installed redundantly in stacks, used to seal, control, and/or monitor oil and gas wells. Typically, a blowout preventer includes a number of components, such as, for example, rams, annulars, accumulators, test valves, kill and/or choke lines and/or valves, riser connectors, hydraulic connectors, and/or the like, many of which may be hydraulically actuated.

Typically, in a subsea well, such hydraulic actuation is achieved by pumping hydraulic fluid from a surface installation, through one or more hydraulic lines, and to the subsea blowout preventer.

Examples of subsea pumps are disclosed in U.S. Pat. Nos. 8,382,457; 8,500,419; and 8,083,501.

SUMMARY

Some embodiments of the present subsea pumping apparatuses are configured, through one or more connectors (e.g., hydraulic stabs, interface ports, and/or the like) and/or a frame and/or housing to directly couple to and/or be in direct fluid communication with a hydraulically actuated device of a blowout preventer (e.g., and thus be disposed above a sea floor).

Some embodiments of the present subsea pumping apparatuses are configured, through a desalination system having, for example, a reverse osmosis membrane and a pump configured to pass sea water through the membrane, to allow for subsea production of hydraulic fluid.

Some embodiments of the present subsea pumping apparatuses are configured, through one or more valves, each in fluid communication with an outlet of a pump and configured to route hydraulic fluid from the outlet to an area having a lower pressure than an internal pressure of the outlet (e.g., a subsea environment, a reservoir, an inlet of the pump, and/or the like), to allow for a reduction of a load on and/or control of hydraulic fluid flow from the pump and/or a reduction of the internal pressure of the outlet.

Some embodiments of the present subsea pumping apparatuses are configured, through a fluid reservoir in fluid communication with at least one pump, to store hydraulic fluid subsea.

Some embodiments of the present subsea pumping apparatuses comprise one or more subsea pumps, each having an inlet and an outlet, and one or more motors, each configured to actuate at least one of the one or more pumps, where the subsea pumping apparatus is configured to be in fluid communication with a hydraulically actuated device of a blowout preventer. In some embodiments, the hydraulically actuated device comprises at least one of a ram, an annular, a connector, and a failsafe valve function.

In some embodiments, the hydraulic fluid comprises at least one of sea water, desalinated water, treated water, and an oil-based fluid.

Some embodiments comprise one or more hydraulic stabs, each in fluid communication with at least one of the one or more pumps, where the subsea pumping apparatus is configured to be in direct fluid communication with a hydraulically actuated device of a blowout preventer via the one or more hydraulic stabs.

Some embodiments comprise a desalination system configured to desalinate sea water to produce at least a portion of the hydraulic fluid. In some embodiments, the desalination system comprises a reverse osmosis membrane and a pump configured to pass sea water through the membrane to produce the hydraulic fluid.

Some embodiments comprise one or more valves, each in fluid communication with the outlet of at least one of the one or more pumps and configured to selectively route hydraulic fluid from the outlet to at least one of a subsea environment, a reservoir, and the inlet of the pump.

Some embodiments comprise a fluid reservoir in fluid communication with at least one of the one or more pumps, the fluid reservoir configured to store at least a portion of the hydraulic fluid. In some embodiments, the fluid reservoir comprises an accumulator. In some embodiments, the fluid reservoir comprises a piston configured to vary an internal volume of the fluid reservoir, the piston having a surface exposed to sea water. In some embodiments, the fluid reservoir comprises a flexible bladder. In some embodiments, the fluid reservoir comprises an ambient pressure reservoir.

Some embodiments comprise a fluid rail in fluid communication with the outlet of at least one of the one or more pumps. Some embodiments comprise one or more regulators configured to deliver hydraulic fluid from the subsea pumping apparatus to the hydraulically actuated device at one or more pressures.

In some embodiments, at least a portion of the hydraulic fluid is stored on the surface. Some embodiments comprise a hydraulic connector in fluid communication with at least one of the one or more pumps and configured to be coupled to at least one of a rigid conduit and a hot line to supply at least a portion of the hydraulic fluid to the subsea pumping apparatus.

Some embodiments comprise a treatment system configured to supply a dopant to at least a portion of the hydraulic fluid. In some embodiments, the treatment system comprises a dopant pump configured to supply the dopant to the hydraulic fluid. In some embodiments, the treatment system comprises a dopant reservoir configured to store at least a portion of the dopant.

Some embodiments comprise a filtering system configured to filter the hydraulic fluid. In some embodiments, the filtering system comprises a filter. In some embodiments, the filtering system comprises a pump. In some embodiments, the filtering system comprises a bypass valve configured to selectively divert fluid around at least a portion of the filtering system. Some embodiments comprise an ultraviolet (UV) light configured to expose at least a portion of the hydraulic fluid to UV light.

In some embodiments, at least one of the one or more pumps comprises a piston pump, diaphragm pump, centrifugal pump, vane pump, gear pump, gerotor pump, or screw pump. In some embodiments, at least one of the one or more pumps comprises a variable displacement pump. In some embodiments, at least one of the one or more pumps comprises a fixed displacement pump. In some embodiments, at least one of the one or more pumps comprises a bidirectional pump. In some embodiments, the outlet of at least one of the one or more pumps is in fluid communication with an inlet of at least one other pump. In some embodiments, the one or more pumps comprises two pumps. Some embodiments comprise a fluid-filled pump chamber, at least one of the one or more pumps disposed within the pump chamber.

In some embodiments, at least one of the one or more motors comprises a synchronous alternating current (AC) motor, an asynchronous AC motor, a brusher direct current (DC) motor, a brushless DC motor, or a permanent magnet DC motor. In some embodiments, at least one of the one or more motors is configured to actuate at least two of the one or more pumps. In some embodiments, at least one of the one or more motors is coupled to at least one of the one or more pumps via a gear box. In some embodiments, at least one of the one or more motors is directly coupled to at least one of the one or more pumps such that neither a shaft seal of the motor nor a shaft seal of the pump is exposed to the subsea environment.

Some embodiments comprise one or more batteries coupled to the subsea pumping apparatus and configured to provide electrical power to at least one of the one or more motors. In some embodiments, the one or more batteries are configured to provide power to a majority of the one or more motors. Some embodiments comprise an atmospheric pressure vessel, at least one of the one or more batteries disposed within the pressure vessel. Some embodiments comprise a pressure-compensated fluid-filled chamber, at least one of the one or more batteries disposed in the fluid-filled chamber.

Some embodiments comprise an electrical connector in electrical communication with at least one of the one or more motors and configured to be coupled to an auxiliary cable to provide electrical power to the subsea pumping apparatus. In some embodiments, the electrical connector comprises an inductive coupler.

Some embodiments are configured to be directly coupled to another of the present subsea pumping apparatuses. Some embodiments are configured to be directly coupled to a blowout preventer.

In some embodiments, at least a portion of the subsea pumping apparatus is configured to be retrievable by a remotely operated underwater vehicle (ROV). Some embodiments comprise one or more ROV stabs configured to allow at least one of electrical or hydraulic ROV control of the subsea pumping apparatus.

Some embodiments comprise a control circuit, the control circuit comprising one or more motor controllers, each motor controller in electrical communication with at least one of the one or more motors and configured to selectively adjust a speed of the motor. In some embodiments, at least one of the one or more motor controllers is configured to adjust a speed of a motor by selectively activating and deactivating the motor. In some embodiments, at least one of the one or more motor controllers is configured to selectively adjust a speed of a motor to a speed selected from at least three pre-determined speeds.

Some embodiments comprise a control circuit, the control circuit comprising one or more valve controllers, where each valve controller is in electrical communication with at least one of the one or more valves and is configured to adjust an output of a pump by selectively varying the position of the valve between an open and a closed position.

Some embodiments comprise one or more sensors coupled to the subsea pumping apparatus and configured to capture data indicative of at least one of pressure, flow rate, temperature, conductivity, pH, position, velocity, acceleration, current, and voltage. Some embodiments comprise circuitry for communicating a signal indicative of the data captured by the one or more sensors. Some embodiments comprise a memory coupled to the circuitry.

Some embodiments comprise a processor configured to control, based at least in part on the data captured by the one or more sensors, actuation of at least one of: at least one of the one or more motors and at least one of the one or more pumps. In some embodiments, the processor is configured to detect, based at least in part on the data captured by the one or more sensors, an abnormal operation associated with one or more components including at least one of at least one of the one or more pumps, at least one of the one or more motors, hydraulically actuated device, and blowout preventer, perform a diagnostic analysis of the one or more components, and control the one or more components based at least in part on at least one of the detected abnormal operation and a result of the diagnostic analysis. Some embodiments comprise a memory coupled to the processor. In some embodiments, the processor is configured to electrically communicate with an above sea control interface. Some embodiments comprise a battery configured to provide electrical power to the processor. In some embodiments, the processor is coupled to the subsea pumping apparatus.

Some embodiments of the present redundant pressure systems comprise a first flow source comprising a rigid conduit configured to provide hydraulic fluid to a hydraulically actuated device and a second flow source comprising one or more of the present subsea pumping apparatuses configured to provide hydraulic fluid to the hydraulically actuated device, where the first and second flow sources are configured to simultaneously supply hydraulic fluid to the hydraulically actuated device.

Some embodiments of the present methods for actuating a plurality of subsea pumps disposed on a subsea pumping apparatus comprise actuating at least a first pump via electrical power from an auxiliary cable and actuating at least a second pump via electrical power from a battery disposed on the subsea pumping apparatus. Some embodiments comprise actuating at least a first pump with a first level of power provided by a first auxiliary cable and actuating at least a second pump with a second level of power provided by a second auxiliary cable, where the first level of power is equal to or larger than the second level of power. In some embodiments, at least one pump is in series with at least one other pump. In some embodiments, at least one pump is in parallel with at least one other pump.

Some embodiments of the present methods for actuating one or more subsea pumps disposed on a subsea pumping apparatus comprise actuating a valve of the subsea pumping apparatus to divert hydraulic fluid from an outlet of at least one of the one or more pumps and routing the diverted hydraulic fluid to at least one of a subsea environment, a reservoir, and an inlet of the at least one of the one or more pumps.

Some embodiments of the present methods for actuating one or more subsea pumps disposed on a subsea pumping apparatus comprise selectively activating and deactivating at least one motor configured to actuate at least one of the one or more pumps.

Some embodiments of the present methods for subsea production of hydraulic fluid for actuating a hydraulically actuated device comprise pumping sea water through a subsea membrane to produce the hydraulic fluid. Some embodiments comprise mixing at least a portion of the hydraulic fluid with a dopant.

Some embodiments of the present methods for actuating a hydraulically actuated device comprise providing hydraulic fluid to the hydraulically actuated device using one or more pumps disposed on a subsea pumping apparatus, where the one or more pumps are in direct fluid communication with the hydraulically actuated device. Some embodiments comprise varying an actuation speed of the hydraulically actuated device by varying a speed of a motor coupled to at least one of the one or more pumps. In some embodiments, at least one of the one or more pumps is a bi-directional hydraulic pump.

Some embodiments of the present methods for controlling a pressure within a subsea hydraulic system comprise determining an amount of hydraulic fluid leakage from the subsea hydraulic system and providing, with one or more subsea pumps, an amount of hydraulic fluid to the subsea hydraulic system that substantially matches the amount of hydraulic fluid leakage.

Some embodiments of the present methods for controlling a plurality of motor-actuated subsea pumps comprise recording a run-time of a first motor over a pre-determined period of time and deactivating the first motor and activating a second motor if the recorded run-time exceeds a pre-determined threshold. Some embodiments comprise recording a number of motor activations of a first motor over a first pre-determined period of time and activating a second motor in lieu of the first motor during a second pre-determined period of time if the number of motor activations of the first motor over the first pre-determined period of time exceeds a pre-determined threshold. Some embodiment comprise recording a number of motor activations of a motor over a first pre-determined period of time and not deactivating the motor, if the motor is activated, for a second pre-determined period of time if the number of motor activations of the motor over the first pre-determined period of time exceeds a pre-determined threshold.

As used in this disclosure, the term "blowout preventer" includes, but is not limited to, a single blowout preventer, as well as a blowout preventer assembly that may include more than one blowout preventer (e.g., a blowout preventer stack).

Hydraulic fluids of and/or suitable for use in the present pumping apparatuses can comprise any suitable fluid, such as, for example, sea water, desalinated water, treated water, an oil-based fluid, mixtures thereof, synthetic fluids, plant-based fluids, and/or the like.

The term "coupled" is defined as connected, although not necessarily directly, and not necessarily mechanically. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially" and "approximately" may be substituted with "within [a percentage] of" what is specified, where the percentage includes 0.1, 1, 5, and 10%.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

FIGS. 1C and 1D are front and back views, respectively, of the pumping apparatus of FIG. 1A.

FIGS. 4C and 4D are front and back views, respectively, of the pumping apparatus of FIG. 4A.

DETAILED DESCRIPTION OF ILLUSTRATIVE EMBODIMENTS

Figure 1A:
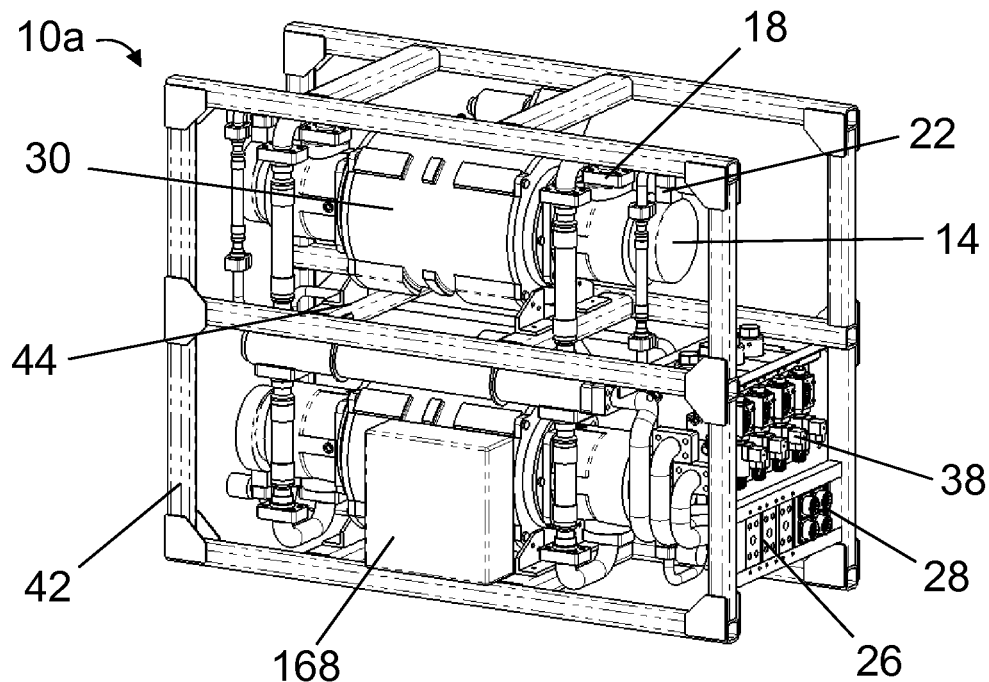
FIG. 1A is a perspective view of a first embodiment of the present subsea pumping apparatuses.
Figure 1B:
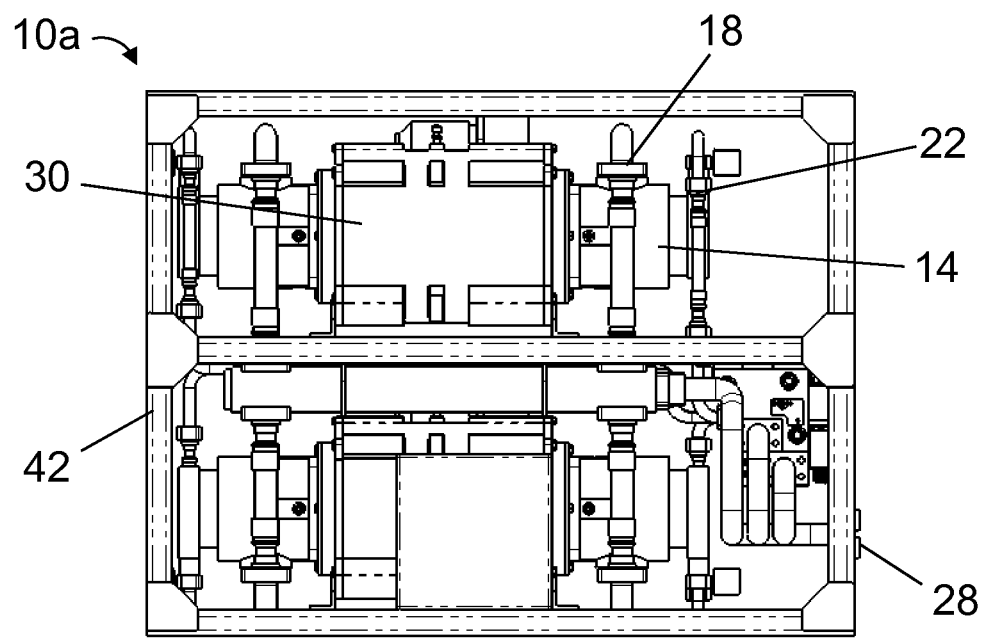
FIG. 1B is a side view of the pumping apparatus of FIG. 1A.
Figure 1E:
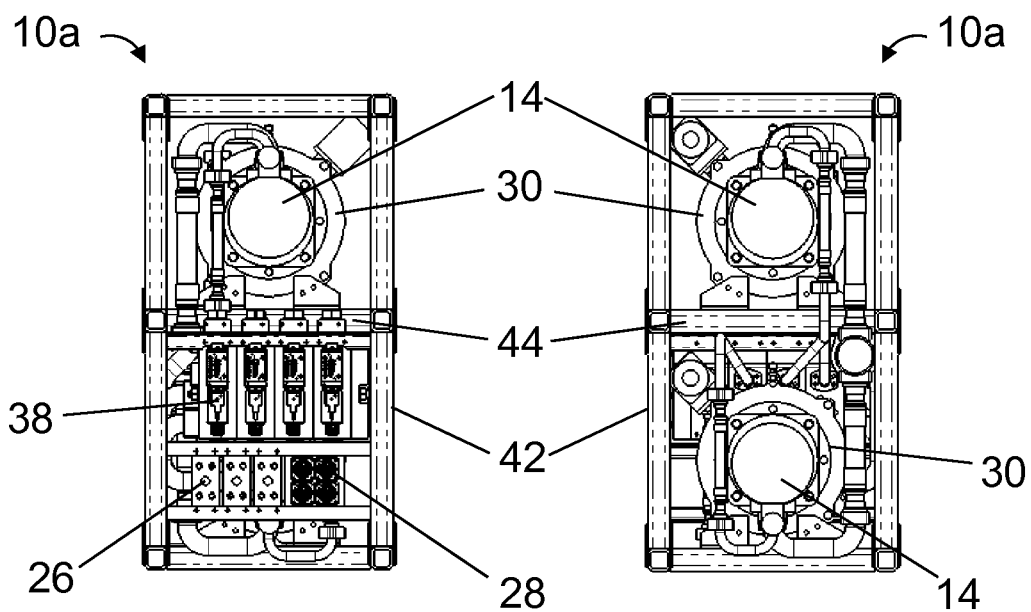
FIG. 1E is a top view of the pumping apparatus of FIG. 1A.
Figure 1E:
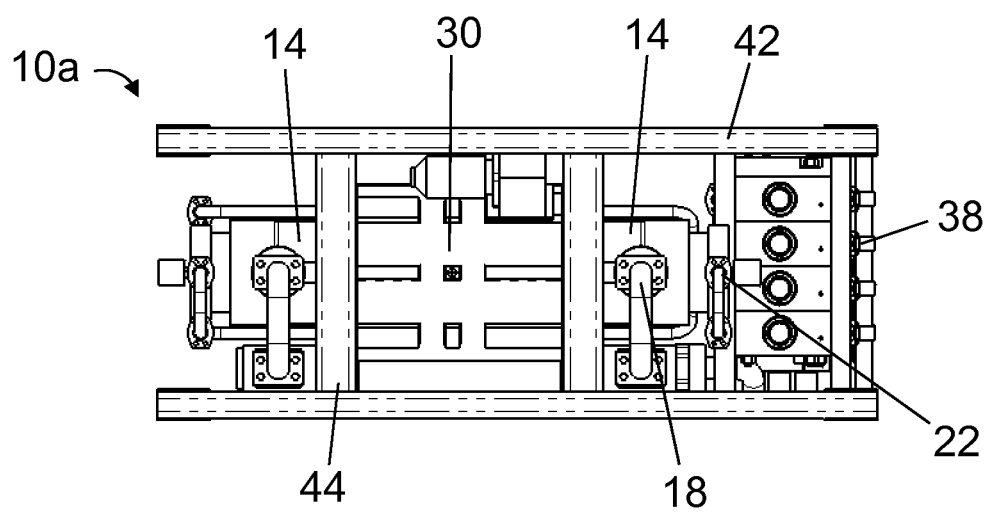

Referring now to the drawings, and more particularly to FIGS. 1A-1E, shown therein and designated by the reference numeral 10a is a first embodiment of the present subsea pumping apparatuses. In the embodiment shown, pumping apparatus 10a comprises one or more subsea pumps 14, each having an inlet 18 and an outlet 22. In this embodiment, pumping apparatus 10a comprises 4 (four) pumps; however, other embodiments of the present pumping apparatuses can comprise any suitable number of pumps, such as, for example, 1, 2, 3, 4, 5, 6, 7, 8, 9, 10, or more pumps. Any pump of the present pumping apparatuses can comprise any suitable pump, such as, for example, a positive displacement pump (e.g., a piston pump, such as, for example, an axial piston pump, radial piston pump, duplex, triplex, quintuplex or the like piston/plunger pump, diaphragm pump, gear pump, vane pump, screw pump, gerotor pump, and/or the like), velocity pump (e.g., a centrifugal pump, and/or the like), and each pump need not be identical to any others of the pumps in type, size, configuration, and/or the like. For further example, one or more of pumps 14 may be variable or fixed displacement, unidirectional or bidirectional, and/or pressure-compensated or not pressure-compensated. For yet further example, one or more of pumps 14 may be a bi-directional pump, an over-center pump, and/or a switched-mode pump. Apparatuses and pumps of the present disclosure can be configured to provide hydraulic fluid at any suitable flow rate and/or pressure. For example, some embodiments of the present apparatuses and/or pumps are configured to provide hydraulic fluid to a hydraulically actuated device at a flow rate of between 3 gallons per minute (gpm) and 130 gpm or higher and at a pressure of between 500 pounds per square inch gauge (psig) and 5,000 psig or higher.

In the embodiment shown, pumping apparatus 10a is configured to be in fluid communication with a hydraulically actuated device of a blowout preventer, such as, for example, a ram, annular, accumulator, test valve, failsafe valve, kill and/or choke line and/or valve, riser joint, hydraulic connector, and/or the like. In some embodiments, such fluid communication can be facilitated, for example, via one or more conduits disposed between the subsea pumping apparatus and the hydraulically actuated device (e.g., whether fixed or removable and whether rigid or flexible), which can be connected to the subsea pumping apparatus via any suitable connector (e.g., stabs 46, described in more detail below, interface ports 26, and/or the like).

In this embodiment, pumping apparatus 10a comprises one or more motors 30, each configured to actuate at least one pump 14 to communicate hydraulic fluid from the pump inlet 18 to the pump outlet 22. In the embodiment shown, each of the one or more motors 30 are electrically actuated; however, in other embodiments, any number of the one or more motors may be hydraulically and/or electrically actuated. In embodiments comprising one or more electric motors (e.g., 10a), any electric motor can comprise any suitable electric motor, such as, for example, a synchronous alternating current (AC) motor, asynchronous AC motor, brushed direct current (DC) motor, brushless DC motor, permanent magnet DC motor, and/or the like. In some embodiments, at least one of motors 30 is pressure-compensated.

In the embodiment shown, at least one motor 30 is directly coupled to at least one pump 14. In some embodiments, such direct coupling is such that neither a shaft seal of the motor nor a shaft seal of the pump is exposed to a subsea environment. For example, a portion of the motor can be configured to extend over a portion of the pump, a portion of the pump can be configured to extend over a portion of the motor, and/or the interface between the motor and the pump can be sealed. In some embodiments, such direct coupling can be facilitated through magnetic coupling. For example, at least a portion of the motor and/or the pump can be magnetic, and actuation forces and/or torques from the motor can be transferred to the pump magnetically. In these embodiments, the motor and/or pump can be substantially sealed from a subsea environment (e.g., with a material that does not substantially interrupt the magnetic coupling between the motor and pump). In this way, a seal and/or a rotatable shaft of the motor and/or pump can be substantially sealed from a subsea environment, while allowing actuation forces and/or torques to be magnetically transferred from the motor to the pump.

In some embodiments, at least one motor 30 has a housing comprising a fluid passageway in fluid communication with an inlet 18 and/or outlet 22 of a pump 14. In this way, hydraulic fluid flow induced by the pump can be passed through the fluid passageway of the motor (e.g., to facilitate motor cooling).

Figure 2A:
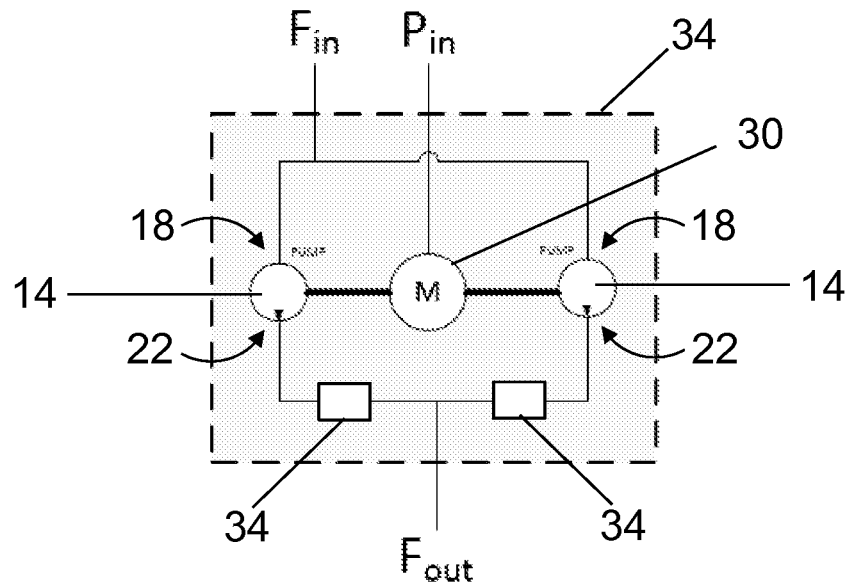
FIG. 2A is a diagram of a pump and motor configuration suitable for use in some embodiments of the present pumping apparatuses.
Figure 2B:
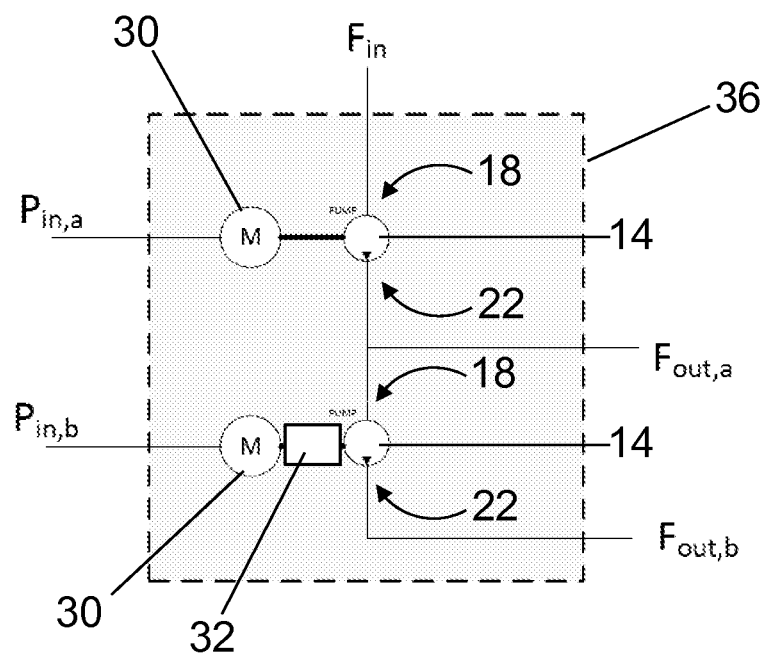
FIG. 2B is a diagram of a pump and motor configuration suitable for use in some embodiments of the present pumping apparatuses.

FIGS. 2A and 2B are diagrams of two illustrative examples of pump and motor configurations suitable for use in some embodiments of the present pumping apparatuses (e.g., 10a). As shown in FIG. 2A, in some embodiments, an outlet 22 of at least one pump 14 is in fluid communication with an outlet 22 of at least one other pump 14 (e.g., at least two pumps are disposed in parallel, which may provide a level of pump redundancy and/or a reduction in peak pumping power consumption). Also shown in FIG. 2A, in some embodiments, at least one motor 30 can be configured to actuate at least two pumps 14. In the depicted example, one or more one-way and/or on-off valves 34 are disposed in fluid communication with an outlet 22 of at least one pump and configured to prevent backflow (e.g., flow entering an inlet of a pump).

As shown in FIG. 2B, in some embodiments, an outlet 22 of at least one pump 14 is in fluid communication with an inlet 18 of at least one other pump 14 (e.g., at least two pumps are disposed in series, for example, to increase hydraulic fluid pressure through staged pumping). Also shown in FIG. 2A, in some embodiments, at least one motor 30 is configured to actuate a single pump 14. In the depicted example, at least one motor 30 is coupled to a pump 14 via a variable ratio drive 32 (e.g., a mechanical variable ratio drive, such as, for example, a planetary gear box and/or the like, a hydraulic variable ratio drive, and/or the like, whether comprising gears, rollers, belts, and/or the like). The pump and motor configurations shown in FIGS. 2A and 2B are shown only by way of example, and are not exclusive. For example, pumping apparatuses of the present disclosure can comprise two or more pumps 14 disposed in series, two or more pumps disposed in parallel, any combination thereof, and/or any other suitable configuration. For further example, pumping apparatuses of the present disclosure can comprise two or more pumps actuated by a single motor 30 (e.g., or group of motors), a single pump actuated by a single motor (e.g., or group of motors), any combination thereof, and/or any other suitable configuration.

As shown, some embodiments of the present pumping apparatuses comprise a sealed fluid-filled pump chamber 36 (e.g., which may be pressure-compensated). In these embodiments, at least one of the pumps and/or motors is disposed within the pump chamber (e.g., to shield the motor and/or pump from a subsea environment). In some embodiments, at least one of the pumps and/or motors is disposed within a hydraulic fluid reservoir (e.g., 50, described in more detail below), to provide for similar shielding and/or protection.

Figure 3A:
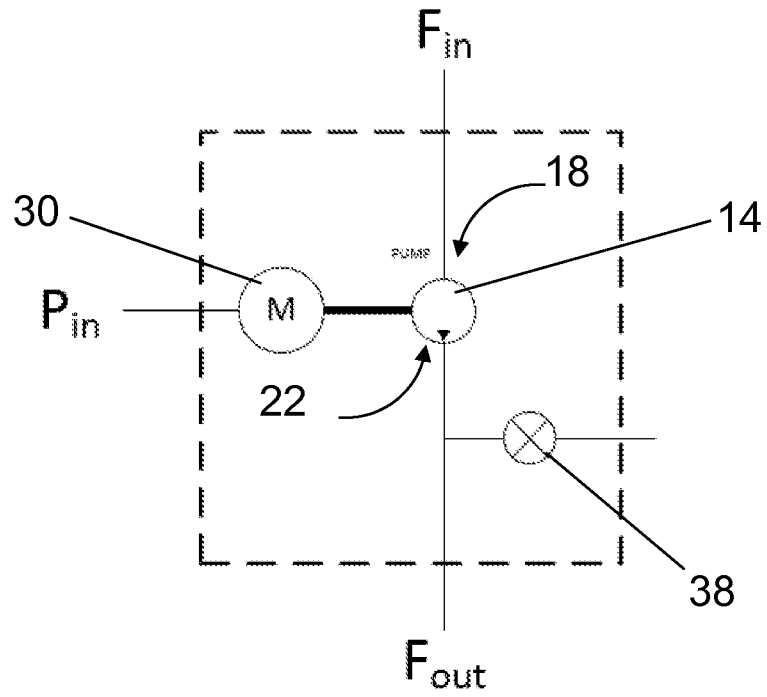
FIG. 3A is a diagram of a pump and valve configuration suitable for use in some embodiments of the present pumping apparatuses.
Figure 3B:
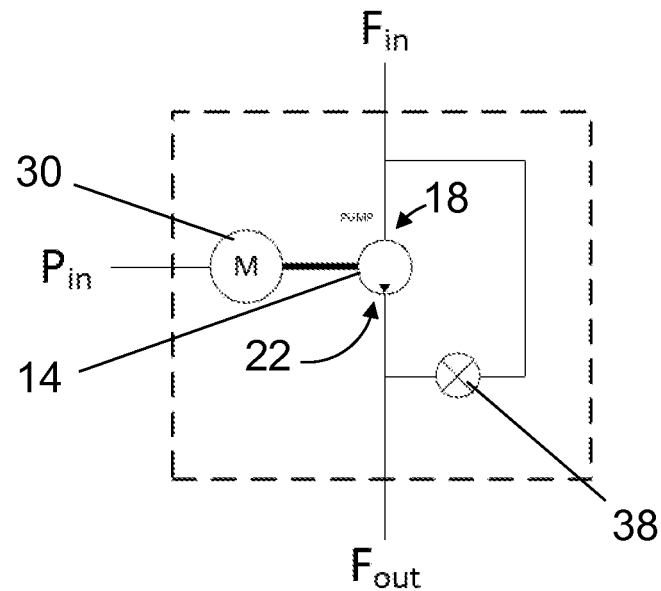
FIG. 3B is a diagram of a pump and valve configuration suitable for use in some embodiments of the present pumping apparatuses.
Figure 4A:
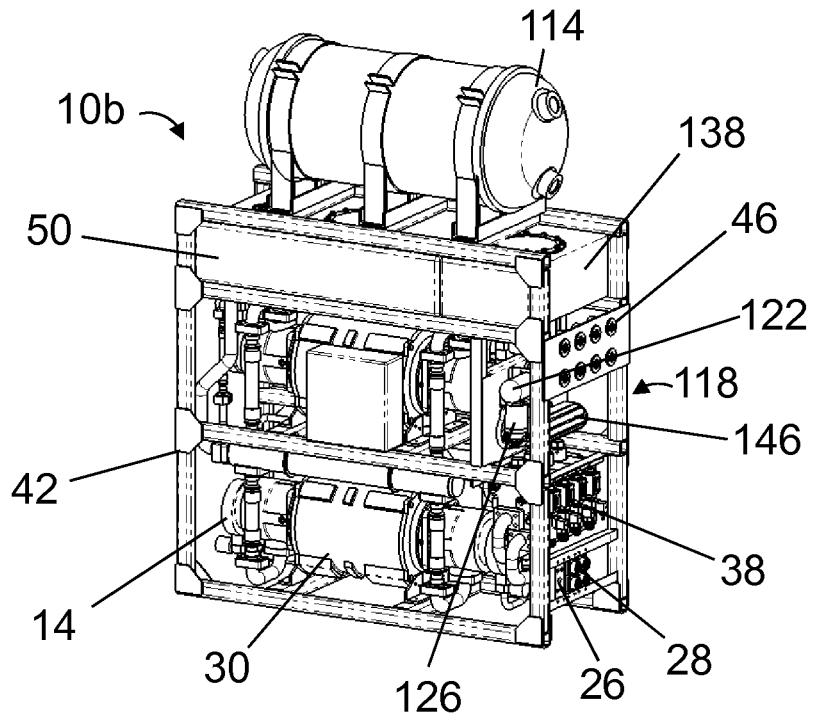
FIG. 4A is a perspective view of a second embodiment of the present subsea pumping apparatuses.
Figure 4B:
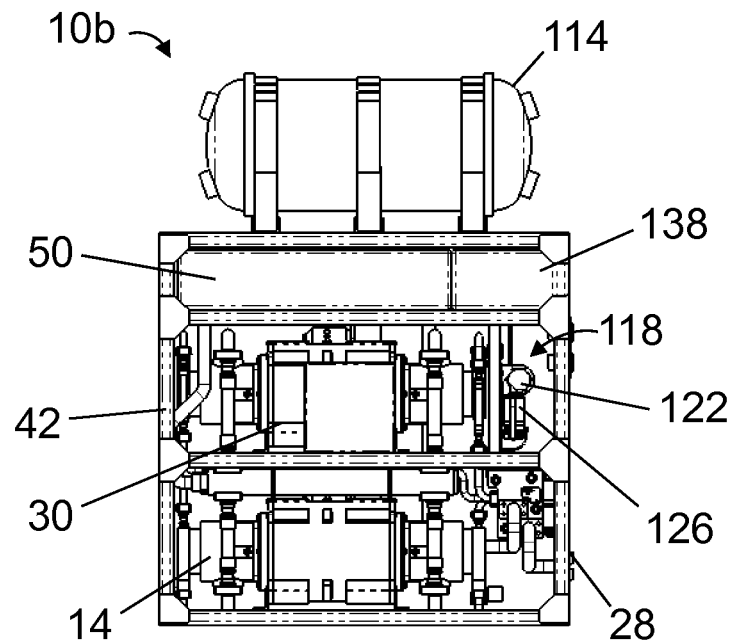
FIG. 4B is a side view of the pumping apparatus of FIG. 4A.
Figure 4E:
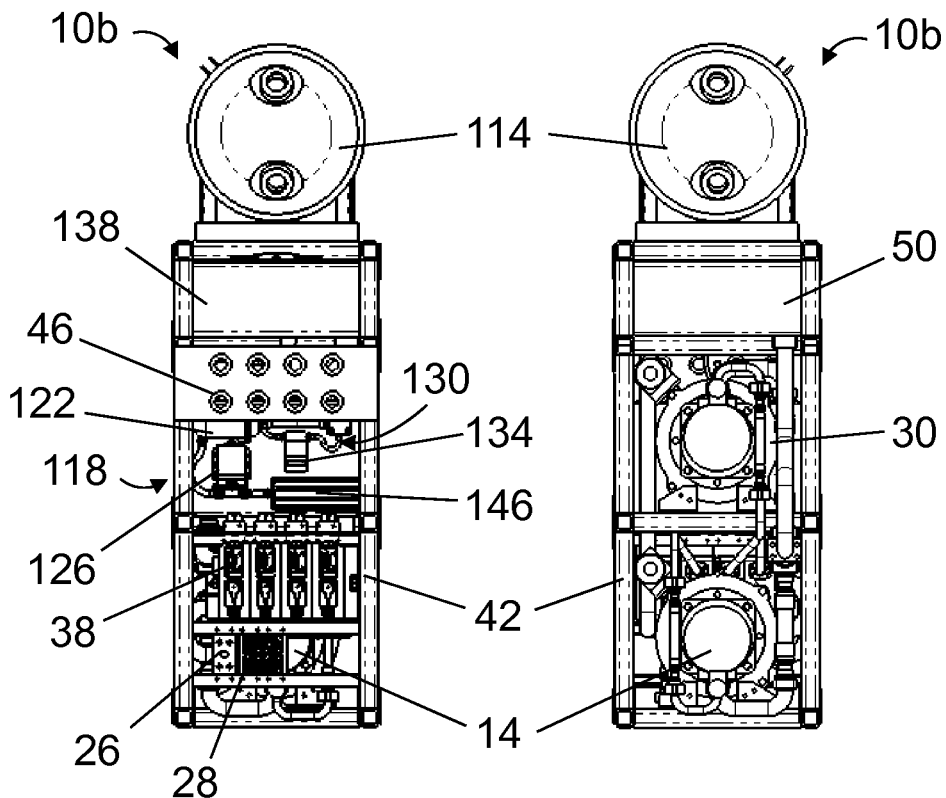
FIG. 4E is a partially cutaway top view of the pumping apparatus of FIG. 4A.
Figure 4E:
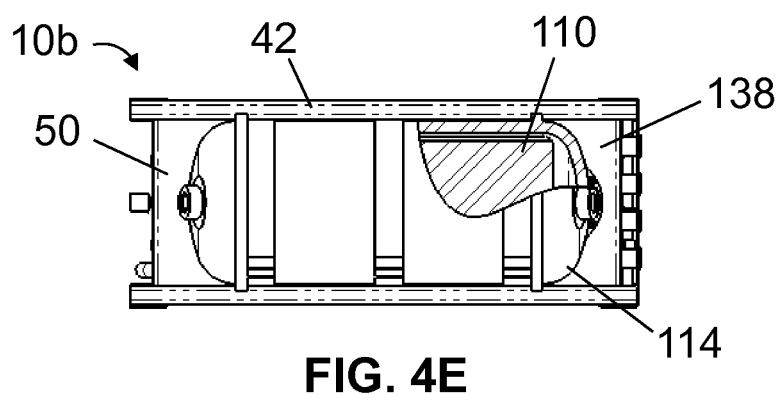

FIGS. 3A and 3B are diagrams of two illustrative examples of pump and valve configurations suitable for use in some embodiments of the present pumping apparatuses (e.g., 10*a*). As shown, the present pumping apparatuses can comprise one or more valves 38, each in fluid communication with an outlet 22 of at least one pump 14 and configured to selectively divert and/or route hydraulic fluid from the outlet 22. Any valve 38 can comprise any suitable valve, such as, for example, a 2-way poppet valve, a 3-way proportional unloader valve, a relief valve, a regulating valve, an unloading valve and/or the like. As shown, in FIG. 3A, a valve 38 can be configured to divert and/or route hydraulic fluid from an outlet 22 of at least one pump 14 to a subsea environment and/or reservoir. As shown in FIG. 3B, a valve 38 can be configured to selectively divert and/or route hydraulic fluid from an outlet 22 of at least one pump 14 to an inlet 18 of a pump. A pressure within a pump outlet may be higher than a pressure within a pump inlet and/or within a reservoir and/or an ambient pressure of a surrounding subsea environment. Thus, in these embodiments, one or more valves 38 can be configured to reduce load on a pump and/or motor (e.g., during motor and/or pump start up), relieve pressure within the pump and/or pump outlet and/or within a portion of a subsea pumping apparatus, and/or regulate the pressure and/or flow rate of hydraulic fluid exiting the outlet.

Referring back to FIGS. 1A-1E, in the depicted embodiment, subsea pumping apparatus 10*a* comprises a frame 42 configured to contain, secure, and/or isolate components (e.g., pumps 14, motors 30, valves 34 and/or 38, interface ports 26, connectors 28, conduits, other components described below, and/or the like) of the subsea pumping apparatus. For example, in this embodiment, the one or more motors (e.g., and associated pumps 14) are disposed longitudinally above one another and within frame 42 (e.g., in a generally vertical orientation). For further example, in this embodiment, each motor 30 is coupled to frame 42 independently of each other motor via one or more motor mounts 44. In this way, frame 42 facilitates isolation of each motor 30 (e.g., and associated pumps 14) from vibrations that may be induced by other motors and/or pumps. However, in other embodiments, frame 42 may be omitted, and conduits, components, component housings, and/or the like can function to locate and/or secure components within the pumping assembly.

In this embodiment, pumping apparatus 10*a* is configured to be directly coupled to a blowout preventer and/or to a hydraulically actuated device of a blowout preventer (e.g., via frame 42, interface ports 26, connectors 28, stabs 46 (described in more detail below), and/or the like) (e.g., pumping apparatus 10*a* is configured to be disposed above a sea floor). In the embodiment shown, at least a portion of (e.g., up to and including all of) subsea pumping apparatus 10*a* is configured to be retrievable by a remotely operated underwater vehicle (ROV). For example, an ROV can manipulate pumping apparatus 10 by, for example, manipulating a portion of frame 42.

In some embodiments, frame 42 comprises tubular members. In these embodiments, such tubular members can provide structural support for motors 30, pumps 14, other components, and/or the like, and/or can be configured as hydraulic and/or electrical conduits.

FIGS. 4A-4E depict various views of a second embodiment 10*b* of the present pumping apparatuses. In this embodiment, pumping apparatus 10*b* comprises one or more hydraulic stabs 46. Stabs 46 of the present disclosure can be male or female. In some embodiments, stabs 46 are configured to allow hydraulic ROV control of the subsea pumping apparatus (e.g., ROV control of a pump, motor, and/or the like) (e.g., and connectors 28 can be configured to allow electrical ROV control of the subsea pumping apparatus). In the embodiment shown, stabs 46 are in fluid communication with at least one of the one or more pumps 14. In pumping apparatus 10*a*, stabs 46 are configured to facilitate direct fluid communication with a hydraulically actuated device of a blowout preventer (e.g., and/or such functionality can be facilitated through interface ports 26 and/or the like).

For example, some of the present methods for actuating a hydraulically actuated device comprise providing hydraulic fluid to the hydraulically actuated device using one or more pumps (e.g., 14) disposed on a subsea pumping apparatus (e.g., 10*b*), where the one or more pumps are in direct fluid communication with the hydraulically actuated device (e.g., via stabs 46 and/or without any intervening valves, accumulators, and/or the like between the pumping apparatus and the hydraulically actuated device) (e.g., to allow for displacement controlled actuation of the hydraulically actuated device). For example, in some embodiments, an inlet of a pumping apparatus (e.g., or a pump 14 thereof) and an outlet of a pumping apparatus (e.g., or a pump 14 thereof) can be directly and respectively coupled to an open chamber and an close chamber of a hydraulically actuated device, such as, for example, a choke or kill valve, to allow for displacement controlled actuation of the hydraulically actuated device. Some methods comprise varying an actuation speed of the hydraulically actuated device by varying a speed of a motor (e.g., 30) (e.g., via one or more motor controllers 174, described in more detail below) coupled to at least one of the one or more pumps and/or by varying a position of a valve (e.g., 38) (e.g., via one or more valve controllers, described in more detail below) in fluid communication with an outlet (e.g., 22) of at least one of the one or more pumps. In some methods, at least one of the one or more pumps is a bi-directional hydraulic pump. In such embodiments, at least one bi-directional hydraulic pump can be actuated in a first direction to cause actuation of the device in a first direction, and can be actuated in a second direction to cause actuation of the device in a second direction. In some methods, at least one of the one more pumps is an over-center variable displacement hydraulic pump. In some methods, at least one of the one more pumps is a switched-mode pump.

Figure 8:
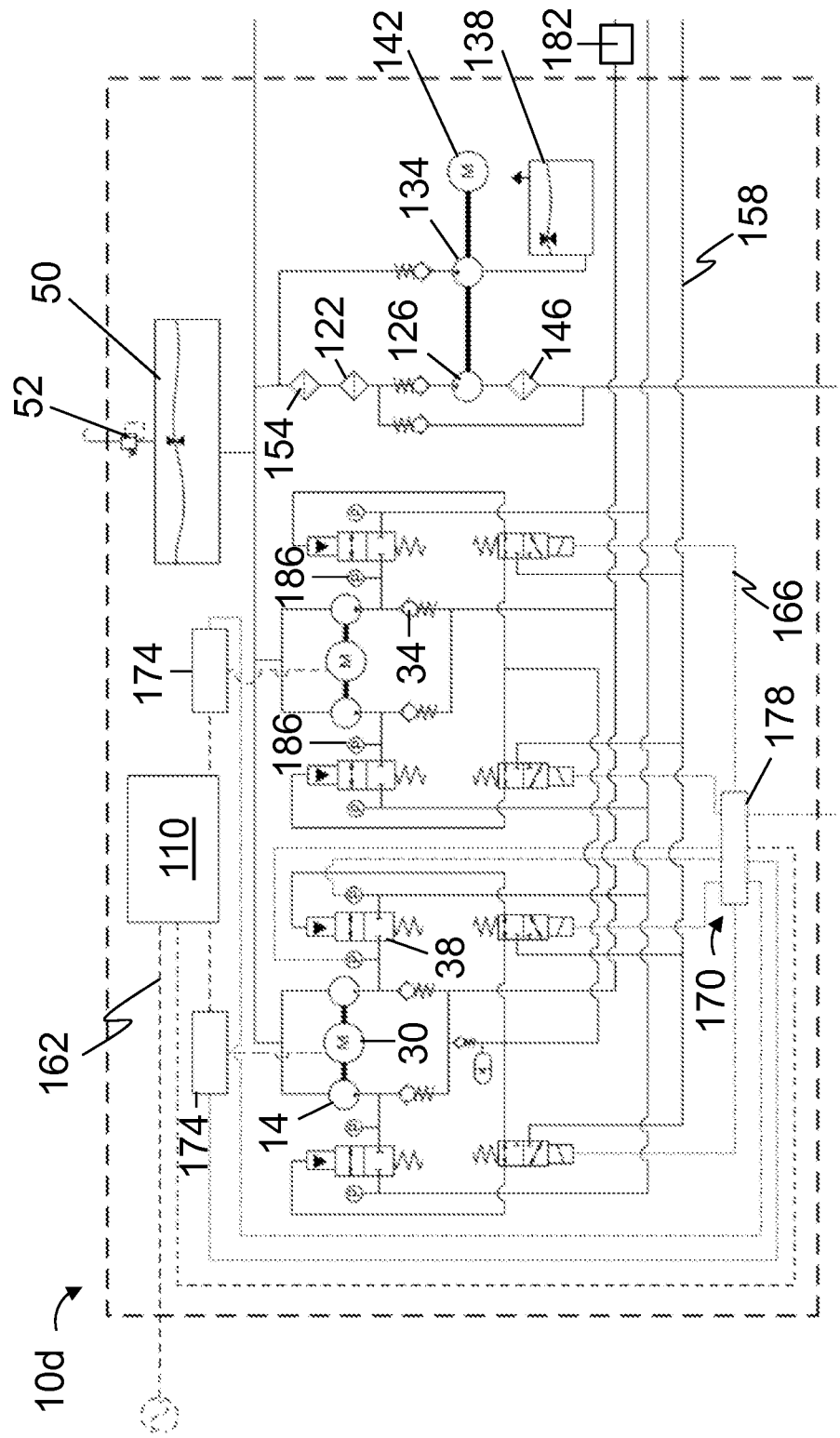
FIG. 8 is a diagram of a fourth embodiment of the present subsea pumping apparatuses.

In the embodiment shown, pumping apparatus 10b comprises a fluid reservoir 50 in fluid communication with at least one pump 14. For example, in this embodiment, fluid reservoir 50 is configured to store hydraulic fluid (e.g., received from a return line of a hydraulically actuated device, from a rigid conduit and/or hot line, from a desalination and/or treatment system, and/or the like). In some embodiments, fluid reservoir 50 is configured to store overflow hydraulic fluid from a portion and/or component of pumping apparatus 10b, another reservoir, and/or the like (e.g., and may comprise an overflow relief valve 52, as shown in FIG. 8).

In some embodiments, fluid reservoir 50 is an accumulator (e.g., to store hydraulic fluid). Some embodiments comprise multiple accumulators (e.g., whether or not configured as a fluid reservoir 50, for example to store pressurized hydraulic fluid) (e.g., configured in parallel and/or series). In some embodiments, accumulators can facilitate a reduction in hydraulic flow rate and/or pressure spikes and/or provide pressurized hydraulic fluid in addition to or lieu of pressurized hydraulic fluid provided by pumps 14 (e.g., and thus function as a pressurized hydraulic fluid buffer).

Figure 5A:
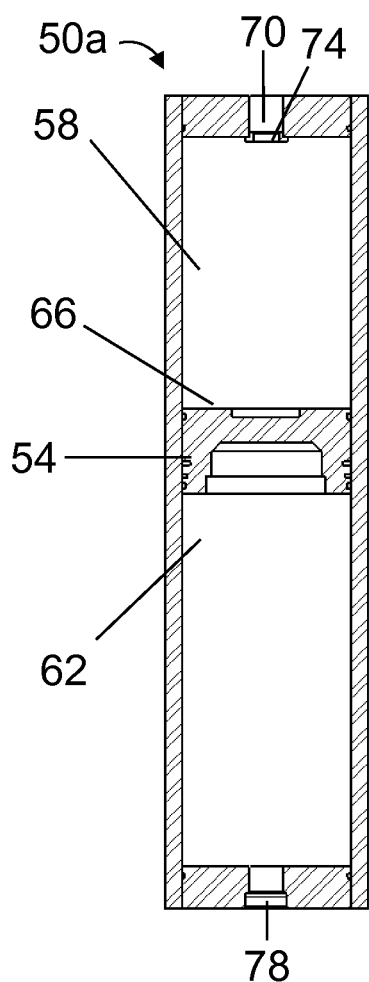
FIG. 5A is a cross-sectional side view of a fluid reservoir suitable for use in some embodiments of the present pumping apparatuses.

FIG. 5A depicts one example of a fluid reservoir 50a suitable for use in some embodiments of the present pumping apparatuses. In the embodiment shown, fluid reservoir 50a comprises a piston 54 configured to vary an internal volume of the reservoir. For example, in this embodiment, reservoir 50a defines a first portion 58 configured to receive sea water and a second portion 62 configured to store hydraulic fluid, the first and second portions separated by slidable piston 54 (e.g., which may be biased towards first portion 58 and/or second portion 62 via one or more springs). In the depicted embodiment, a surface 66 of piston 54 can be exposed to sea water (e.g., within first portion 58), which can enter and/or exit the first portion through a vent or opening 70. In the embodiment shown, a coarse filter 74 is disposed between first portion 58 and a subsea environment (e.g., over vent or opening 70) (e.g., which may minimize the undesired entry of particles and/or contaminants into reservoir 50a). In this embodiment, piston 54 can be slidably displaced (e.g., by water pressure acting on surface 66) within the reservoir until a pressure within first portion 58 substantially equals a pressure within second portion 62. In the embodiment shown, reservoir 50a comprises a connection 78 configured to facilitate hydraulic fluid flow into and/or out of second portion 62.

Figure 5B:
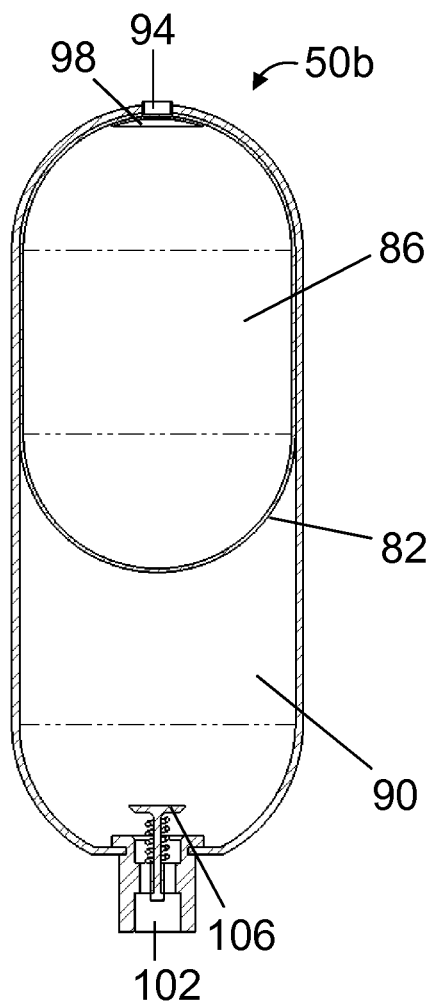
FIG. 5B is a cross-sectional side view of a fluid reservoir suitable for use in some embodiments of the present pumping apparatuses.

FIG. 5B depicts one example of a fluid reservoir 50b suitable for use in some embodiments of the present pumping apparatuses. In the embodiment shown, fluid reservoir 50b comprises a flexible bladder 82 (e.g., whether elastic and/or inelastic). In the depicted embodiment, flexible bladder 82 is disposed within fluid reservoir 50b such that a wall of the flexible bladder defines two portions of an interior of reservoir 50b: a first portion 86 within bladder 82, and a second portion 90 outside of the bladder. In the embodiment shown, first portion 86 (e.g., flexible bladder 82) is configured to receive sea water (e.g., which can enter and/or exit first portion 86 through a vent or opening 94) to vary an internal pressure of second portion 90; however, in other embodiments, first portion 86 (e.g., flexible bladder 82) can be configured to store hydraulic fluid, and second portion 90 can be configured to receive sea water to vary an internal pressure of the first portion. In this embodiment, as sea water enters first portion 86, flexible bladder 82 can distend (e.g., if elastic) and/or otherwise displace until a pressure within the first portion substantially equals a pressure within second portion 90. As shown, a coarse filter 98 is disposed between first portion 86 and a subsea environment (e.g., over vent or opening 94) (e.g., which may minimize the undesired entry of particles and/or other contaminants into reservoir 50b). In the embodiment shown, reservoir 50b comprises a connection 102 configured to allow hydraulic fluid flow into and/or out of second portion 90. In this embodiment, fluid reservoir 50b comprises a anti-extrusion poppet valve 106 configured to prevent extrusion of bladder 82 out of connection 102.

In some embodiments, at least a portion of the hydraulic fluid can be stored above sea. For example, in the embodiment shown, pumping apparatus 10b comprises a hydraulic connector (e.g., interface port 26, stab 46, and/or the like) in fluid communication with at least one of one or more pumps 14 and configured to be coupled to at least one of a rigid conduit and a hot line to supply at least a portion of the hydraulic fluid from above sea to the subsea pumping apparatus.

Referring back to FIGS. 4A-4E, in this embodiment, pumping apparatus 10b comprises one or more batteries 110 (FIG. 4E) coupled to the subsea pumping apparatus and configured to provide electrical power to at least one of motors 30. For example, in this embodiment, the one or more batteries are configured to power to a majority of the motors (e.g., such that pumping apparatus 10b can adequately actuate a hydraulically actuated device of a blowout preventer without electricity provided from above sea, for example, via an auxiliary cable). Any battery of the present disclosure can comprise any suitable battery, such as, for example, a lithium-ion battery, nickel-metal hydride battery, nickel-cadmium battery, lead-acid battery, and/or the like.

In the embodiment shown, at least one battery 110 is disposed within a vessel 114. For example, in this embodiment, vessel 114 is an atmospheric pressure vessel (e.g., is configured to have an internal pressure of approximately 1 atmosphere (atm)). However, in other embodiments, vessel 114 can be configured as a fluid-filled chamber (e.g., filled with a non-conductive substance, such as, for example, a dielectric substance, and/or the like). In some embodiments, such fluid-filled chambers may be pressure-compensated (e.g., with a piston, flexible bladder, diaphragm, and/or the like, configured to produce a pressure within the chamber hat matches or exceeds a pressure of a subsea environment, for example, similarly to as described above for fluid reservoir 50a and/or 50b).

Batteries of the present pumping apparatuses can be configured as energy storage devices, and may be less susceptible to effectiveness losses at increased pressures than other energy storage devices (e.g., accumulators). Batteries of the present disclosure may (e.g., also) be configured to occupy a smaller volume (e.g., be physically smaller) and/or have a lower weight than other energy storage devices (e.g., accumulators). Thus, batteries of the present subsea pumping apparatuses may be efficiently adapted to provide at least a portion of an energy necessary to, for example, perform emergency operations associated with a blowout preventer (e.g., autoshear functions, emergency disconnect functions, and/or dead man functions).

In the embodiment shown, pumping apparatus 10*b* comprises at least one electrical connector (e.g., an interface port 26, connector 28, and/or the like) in electrical communication with at least one motor and configured to be coupled to an auxiliary cable to provide electrical power to the subsea pumping apparatus. In some embodiments, such electrical connectors comprise inductive couplers. Power provided via auxiliary cable(s) can be used, for example, to power one or more of motors 30, charge one or more of batteries 110, and/or the like.

For example, in some embodiments, any number of one or more pumps 14 (e.g., up to and including all of pumps 14) can be actuated, in part or in whole, via electrical power from auxiliary cable(s), and/or via electrical power from one or more batteries 110. To illustrate, some of the present methods for actuating a plurality of subsea pumps (e.g., 14) disposed on a subsea pumping apparatus (e.g., 10*b*) comprise actuating at least a first pump with a first level of power provided by a first auxiliary cable, and actuating at least a second pump with a second level of power provided by a second auxiliary cable, where the first level of power is equal to or larger than the second level of power.

In the embodiment shown, pumping apparatus 10*b* comprises a desalination system 118 configured to desalinate sea water to produce at least a portion of the hydraulic fluid. The following descriptions of reverse osmosis desalination systems are provided only by way of example, as embodiments of the present pumping apparatuses can comprise any suitable desalination system, such as, for example, a thermal desalination system.

For example, in this embodiment, desalination system 118 comprises a reverse osmosis membrane 122 and a pump 126 configured to pass sea water through the membrane to produce hydraulic fluid (e.g., desalinated water). Desalination system 118 is configured to produce a portion of (e.g., up to and including all of) the hydraulic fluid for subsea pumping apparatus 10*b*.

In the embodiment shown, pumping apparatus 10*b* comprises a treatment system 130 configured to supply a dopant to at least a portion of the hydraulic fluid. Dopants suitable for use in the present treatment systems can comprise any suitable dopant, such as, for example anti-corrosion and/or lubricity additives, glycol, biocides, freeze-point suppressants, and/or the like. In this embodiment, treatment system 130 comprises a dopant pump 134 configured to supply the dopant to a portion of the hydraulic fluid (e.g., whether or not the portion of the hydraulic fluid was generated by a desalination system). In the embodiment shown, treatment system 130 comprises a dopant reservoir 138 configured to store at least a portion of the dopant. In some embodiments, dopant reservoir 138 can be configured to interface with an ROV, for example, to facilitate refilling of the reservoir (e.g., via one or more interface ports, connections, stabs, and/or the like).

Some embodiments of the present pumping apparatuses, regardless of the presence of a desalination and/or dopant system, are configured to provide non-desalinated and/or untreated sea water to a hydraulically actuated device of a blowout preventer (e.g., in an emergency situation) (e.g., via one or more emergency pumps, which may be dedicated and/or may comprise a pump 14, 126, and/or 134).

Some embodiments of the present pumping apparatuses comprise a heat exchanger configured to exchange heat between the hydraulic fluid and a subsea environment (e.g., to cool hydraulic fluid, which may be heated during pumping).

Figure 6:
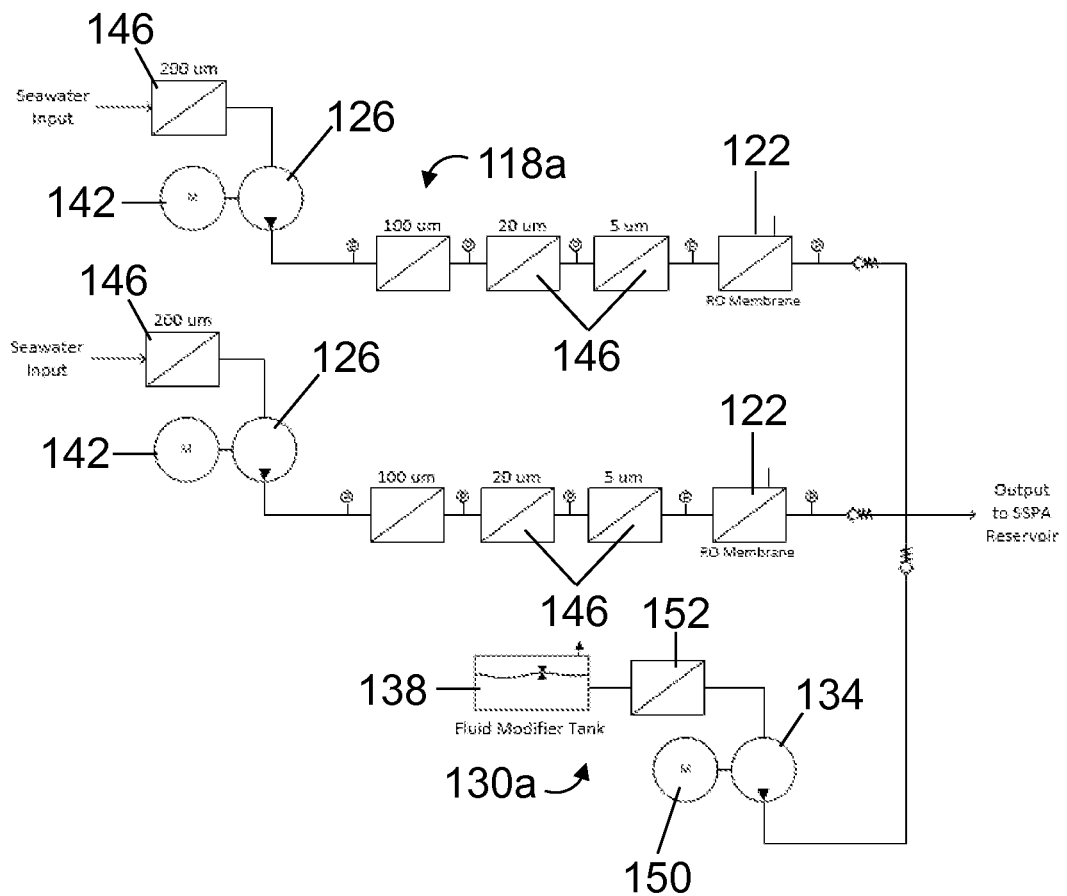
FIG. 6 is a diagram of a desalination system and a treatment system suitable for use in some embodiments of the present pumping apparatuses.
Figure 7A:
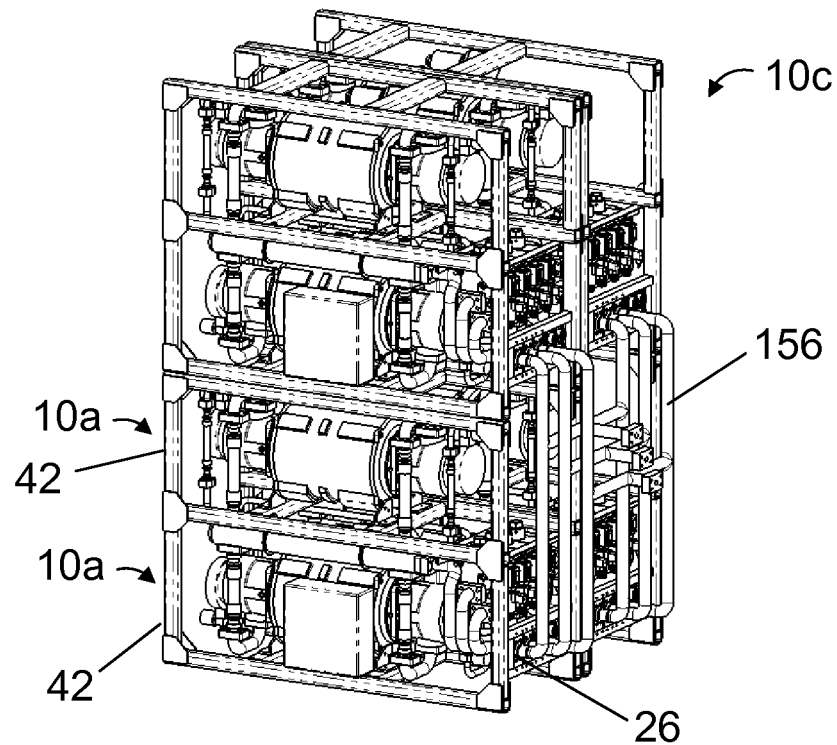
FIG. 7A is a perspective view of a third embodiment of the present subsea pumping apparatuses.
Figure 7B:
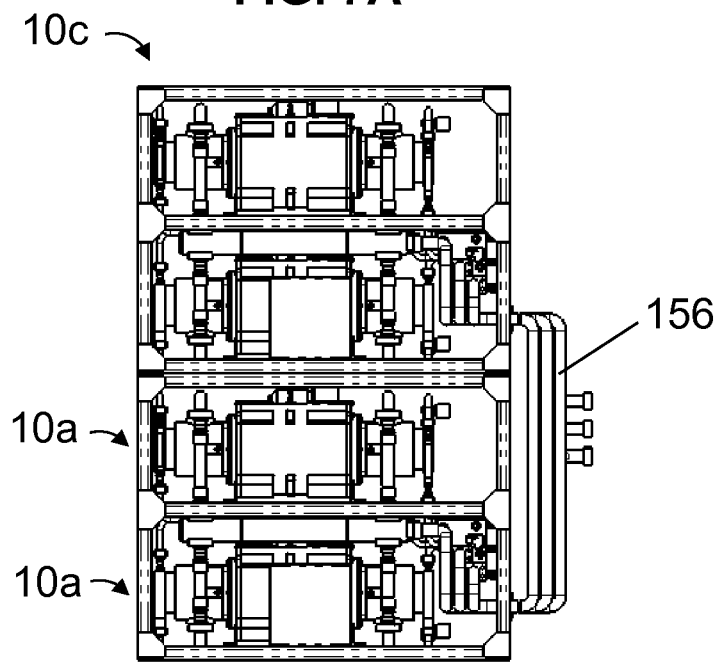
FIG. 7B is a side view of the pumping apparatus of FIG. 7A.
Figures 7C, 7D:
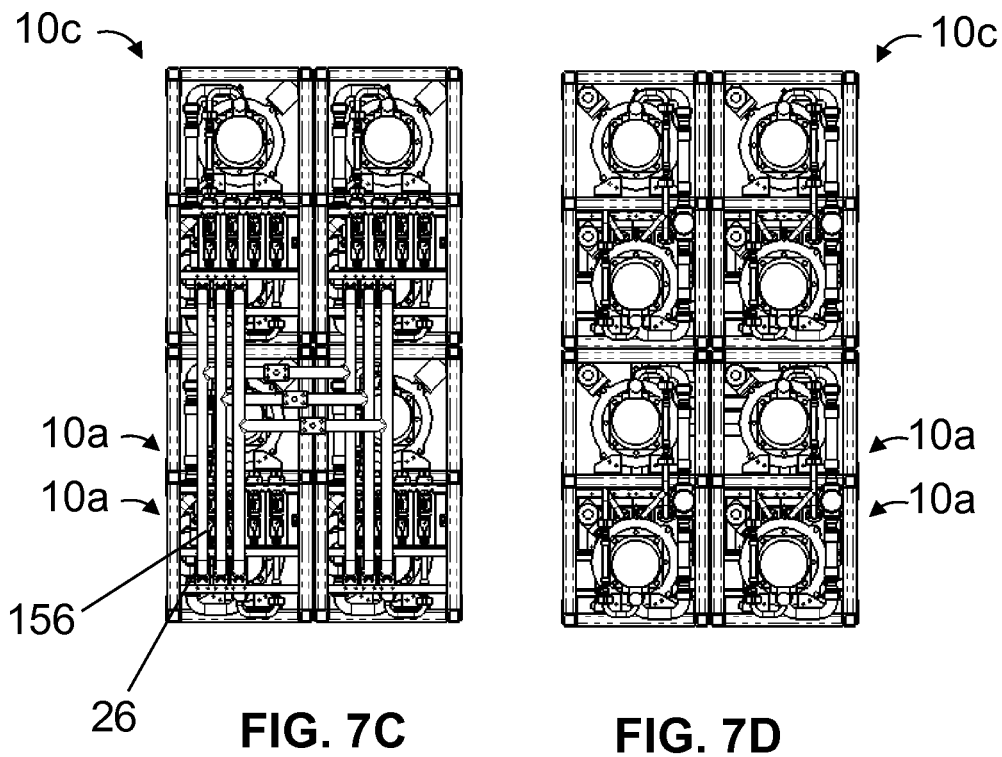
FIGS. 7C and 7D are front and back views, respectively, of the pumping apparatus of FIG. 7A.
Figure 7E:
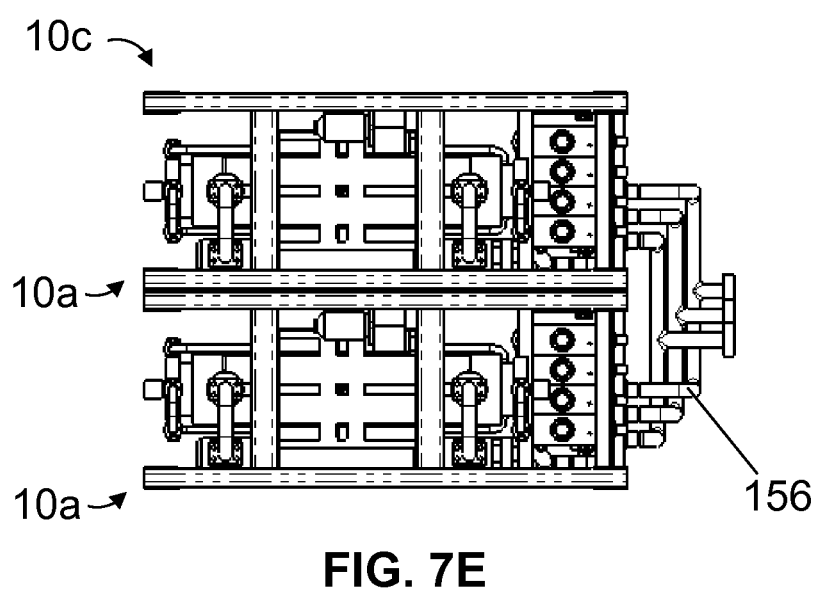
FIG. 7E is a top view of the pumping apparatus of FIG. 7A.

FIG. 6 is a diagram of a desalination system 118*a* and a treatment system 130*a* suitable for use in some embodiments of the present pumping apparatuses (e.g., 10*b*). In the embodiment shown, pumps 126 are configured to be actuated by motors 142 to draw sea water into the desalination system, and are separate from pumps 14 and motors 30; however, in other embodiments, pumps 126 can comprise a pump 14 and/or a pump 134 and/or motors 142 can comprise a motor 30 and/or a motor 150. In this embodiment, desalination system 118*a* comprises one or more filters 146 configured to filter sea water (e.g., which may be disposed in series from coarse to fine along a flow path through the desalination system, as shown). Components of the present desalination systems (e.g., reverse osmosis membrane(s) 122, pump(s) 126, motor(s) 142, filter(s) 146, and/or the like) can be disposed in any suitable configuration, for example, in this embodiment, desalination system 118*a* comprises two reverse osmosis membranes 122 disposed in parallel (e.g., along with associated pumps, motors, and filters). Hydraulic fluid generated by a desalination system of the present disclosure can be used for any suitable purpose within a subsea pumping apparatus, hydraulically actuated device, and/or the like, such as, for example, for hydraulic actuation, for system-leakage make up, for filling reservoir(s), and/or the like.

Also shown in FIG. 6 is an illustrative example of a treatment system 130*a*. In this embodiment, dopant pump 134 is configured to be driven by a motor 150 to draw dopant from dopant reservoir 138, and the pump and motor are separate from pumps 14 and/or 126 and/or motors 30 and/or 142. However, in other embodiments, a pump 134 can comprise a pump 14 and/or 126 and/or a motor 150 can comprise a motor 30 and/or 142. In this embodiment, treatment system 130*a* comprises a filter 152 configured to filter at least a portion of the dopant.

In some embodiments, the present pumping apparatuses, desalination systems, treatment systems, and/or reservoirs comprise an ultraviolet light 154 (FIG. 8) configured to expose at least a portion of the hydraulic fluid to UV light (e.g., to disinfect at least a portion of the hydraulic fluid).

While subsea desalination systems, treatment systems, and/or the like may provide certain advantages (e.g., a reduction in hydraulic lines and/or routing), in some embodiments, at least a portion of a desalination system and/or treatment system can be disposed above sea (e.g., at a surface installation). For example, in some embodiments, hydraulic fluid (e.g., desalinated water) can be produced and/or treated above sea and provided to a pumping apparatus disposed subsea (e.g., via a rigid conduit, hot line, and/or the like connected to an interface port 26, stab 46, and/or the like).

FIG. 7A-7E depict various views of a third embodiment 10*c* of the present subsea pumping apparatuses. As shown, the present pumping apparatuses can be configured to be (e.g., directly) coupled to one another and hydraulically and/or electrically connected in series and/or in parallel (e.g., via conduits 156 connected at interface ports 26, as shown). For example, in this embodiment, subsea pumping apparatus 10*c* comprises one or more (e.g., 4 (four)) subsea pumping apparatuses 10a coupled together. To illustrate, in this embodiment, a frame 42 of each subsea pumping apparatus 10a is coupled to a frame of at least one other subsea pumping apparatus 10a. In these embodiments, a subsea pumping apparatus 10a may be referred to as a subsea pumping module, and subsea pumping apparatus 10c may be referred to as a subsea pumping assembly. In some embodiments, subsea pumping modules (e.g., 10a) (e.g., and/or pumps 14, motors 30, and/or the like) may be removable and/or replaceable within a subsea pumping assembly (e.g., subsea pumping apparatus 10c), for example, via ROV and/or winch manipulation. For example, some embodiments (e.g., 10c) may comprise components (e.g., subsea pumping modules (e.g., 10a), pumps 14, motors 30, and/or the like) that are configured to be modular, replaceable, reconfigurable, and/or interchangeable (e.g., hot swappable) within the subsea pumping apparatus, for example, via removable connection of the component(s) to one or more hydraulic and/or electrical connectors (e.g., 28), interface ports (e.g., 26), stabs (e.g., 46) and/or the like of the subsea pumping apparatus.

FIG. 8 is a diagram of a fourth embodiment 10d of the present subsea pumping apparatuses. In this diagram, examples of fluid pathways are indicated by solid lines 158, examples of (e.g., electrical) power pathways are indicated by long dashed lines 162, and examples of signal pathways are indicated by short dashed lines 166. Any circuitry, controllers, processors, electronic components, and/or the like of the present pumping apparatuses can be sealed in chambers, such as, for example controller housing 168 (FIG. 1) (e.g., an atmospheric and/or pressure-compensated controller housing) (e.g., to protect the components from a subsea environment). Any circuitry, controllers, processors, electronic components, and/or the like of the present pumping apparatuses can be powered by one or more batteries 110 and/or from power communicated from above sea (e.g., via an auxiliary cable). Any circuitry, controllers, processors, electronic components, and/or the like of the present pumping apparatuses can be disposed on the pumping apparatus, disposed above sea (e.g., at a surface installation), and/or disposed subsea but not disposed on the subsea pumping apparatus. Embodiments of the present pumping apparatuses (e.g., 10d) can be configured to vary hydraulic fluid flow rate and/or pressure within and/or from the subsea pumping apparatus via electrical motor control and/or hydraulic pump control.

For example, in the embodiment shown, pumping apparatus 10d comprises a control circuit 170. In this embodiment, control circuit 170 comprises one or more motor controllers 174, each in electrical communication with at least one of motors 30 and configured to selectively adjust a speed of the motor (e.g., by varying an electrical power supplied to the motor and/or by providing a control signal to the motor) (e.g., and thus vary hydraulic fluid flow rate and/or pressure provided by an associated pump(s) 14). In some embodiments, a motor controller 174 can be configured to provide binary and/or variable control. For example, in this embodiment, at least one motor controller 174 is configured to adjust a speed of a motor by selectively activating and deactivating the motor (e.g., binary, or on/off, motor control). In the embodiment shown, at least one motor controller 174 is configured to selectively adjust a speed of a motor to a speed selected from at least three pre-determined speeds. For example, in this embodiment, at least one motor controller 174 is configured to adjust a speed of a motor to a speed of three or more speeds, at least two of the speeds greater than a speed of the motor when the motor is deactivated. In some embodiments, motor controller 174 is configured to adjust a speed of a motor to any suitable speed within a range of speeds (e.g., between 0% and 100% of a maximum motor speed, for example, to provide for full variable motor control).

For further example, in this embodiment, pumping apparatus 10d comprises a control circuit (e.g., 170, in this embodiment) comprising one or more valve controllers (e.g., which, in this embodiment, form component(s) of and/or are integral with a controller or processor 178). In the embodiment shown, the valve controllers (e.g., within controller or processor 178) are configured to adjust an output of a pump 14 by selectively adjusting a valve 38 (e.g., as described above, in fluid communication with an outlet 22 of at least one pump 14 and configured to selectively divert and/or route hydraulic fluid from the pump outlet to a pump inlet, a reservoir, a subsea environment, and/or the like) between an open and a closed position. In this embodiment, the valve controllers and/or valves 38 can be configured such that the valves are selectively adjustable between only a closed and an open position (e.g., binary, or on/off valve control, for example, a 2-way unloader valve 38), and/or can be configured such that the valves are selectively adjustable between at least three pre-determined positions (e.g., variable valve control, for example, a proportional unloader valve 38). In some embodiments, one or more valve controllers are configured to adjust a position of a valve to any suitable position within a range of positions (e.g., between 0% and 100% of a fully opened position, for example, to provide for full variable valve control). In these embodiments, one or more subsea pumps 14 and/or motors 30 can be controlled by actuating a valve 38 (e.g., under control of a valve controller and/or a controller or processor 178) to divert hydraulic fluid from the outlet of one or more pumps (e.g., to an area at a lower pressure than a pressure within the outlet). In this way, one or more valves 38 can be adjusted to reduce a load on a pump and/or motor, relieve pressure within the pump and/or pump outlet, and/or regulate the pressure and/or flow rate of hydraulic fluid exiting the outlet.

The present subsea pumping apparatuses may be configured to provide hydraulic fluid to power to various hydraulically actuated devices, which may vary in operational hydraulic flow rate and pressure requirements. For example, some hydraulically actuated devices may require a flow rate of between 3 gpm and 130 gpm at a pressure of between 500 psig and 5,000 psig for effective and/or desirable operation. Thus, some embodiments of the present subsea pumping apparatuses (e.g., 10d) can be configured to provide hydraulic fluid to a variety of hydraulically actuated devices (e.g., at a range of flow rates and/or pressures, which may include those identified immediately above). Such adjustability may be facilitated, for example, using binary and/or variable hydraulic control of pumps 14 and/or electrical control of motors 30, as described above.

For example, binary hydraulic pump and/or electrical motor control may provide for incremental adjustability of hydraulic fluid flow rate and/or pressure. To illustrate, if each pump 14 of a subsea pumping apparatus is configured to provide hydraulic fluid at a flow rate of 10 gpm, and each motor 30 of the subsea pumping apparatus can actuate two (2) pumps, then flow rate adjustability may be provided in increments of 10 gpm if every pump is configured for binary hydraulic control, or in increments of 20 gpm if every motor is configured for binary electrical control. If a pump 14 or motor 30 of a subsea pumping apparatus is configured for variable hydraulic and/or electrical control, then the pump and/or motor can be configured to provide a range of hydraulic fluid flow rate and/or pressure (e.g., from 0 to 100% of the flow rate capability of the motor and/or pump).

In some embodiments, each of pumps 14 and/or motors 30 can be configured for variable control, and such embodiments can thus be configured to substantially match a hydraulic flow rate and/or pressure requirement for a given hydraulically actuated device. However, other embodiments can comprise any suitable motor and/or pump control configuration (e.g., binary and/or variable, electrical and/or hydraulic, combinations thereof, and/or the like). Thus, some embodiments may provide a flow rate which does not substantially match a desired hydraulic fluid flow rate and/or pressure for a given hydraulically actuated device. In some embodiments, if a flow rate provided by a subsea pumping apparatus is higher than desired for a given hydraulically actuated device, system pressure can increase, and a relief, bypass, and/or regulating valve 182 can be actuated to route excess hydraulic fluid flow to a reservoir, subsea environment, and/or the like (e.g., and thus reduce system pressure).

In the embodiment shown, subsea pumping apparatus 10*d* comprises one or more sensors 186 coupled to the subsea pumping apparatus and configured to capture data indicative of at least one of pressure, flow rate, temperature, conductivity, pH, position, velocity, acceleration, current, voltage, and/or the like. In some embodiments, the present pumping apparatuses comprise circuitry for communicating a signal indicative of the data captured by the one or more sensors (e.g., to an above-surface installation). In some embodiments, the pumping apparatuses comprise a memory coupled to the circuitry (e.g., to store data indicative of the data captured by the one or more sensors).

As shown, pumping apparatus 10*d* comprises a processor or controller 178. In this embodiment, processor or controller 178 is configured to control, based at least in part on the data captured by one or more sensors 186, actuation of at least one of: at least one of motors 30 (e.g., via a motor controller 174) and at least one of pumps 14 (e.g., via a valve controller); however, in other embodiments, processor or controller 178 can be configured to control the subsea pumping apparatus regardless of data captured by one or more sensors 186 (e.g., and in some of these embodiments, one or more sensors 186 can be omitted).

For example, sensors 186 can be configured to capture data indicative of an outlet pressure and/or flow rate (e.g., of a pump 14, a group of pumps 14, and/or an outlet of the subsea pumping apparatus) and processor or controller 178 can receive the data and determine, for example, which pumps 14 and/or motors 30 to actuate. For example, processor or controller 178 can receive the data from sensors 186 and compare the data to a known, calculated, and/or commanded hydraulic fluid pressure and/or flow rate requirement for a given hydraulically actuated device. If the data indicates that the outlet pressure and/or flow rate is lower than the known, calculated, and/or commanded hydraulic fluid pressure and/or flow rate requirement, the processor or controller can adjust the outlet pressure and/or flow rate upwards by activating and/or increasing a speed of one or more motors 30 (e.g., via communication with motor controllers 174) and/or increase an output of one or more pumps 14 (e.g., via communication with valve controllers to move one or more valves 38 towards a closed position). Alternatively, if the data indicates that the outlet pressure and/or flow rate is higher than the known, calculated, and/or commanded hydraulic fluid pressure and/or flow rate requirement, the processor or controller can adjust the outlet pressure and/or flow rate downwards by deactivating and/or decreasing the speed of one or more motors 30, and/or decrease an output of one or more pumps 14 (e.g., via communication with valve controllers to move one or more valves 38 towards an open position).

One way of performing the above control is by using the following example code:

```
function Gain_out = SSPA_Controller(P_atram, Gain_curr, P_setpt, P_band,
P_hydro, P_thresh1, P_thresh2, Gain_max, Gain_min, Gain_thresh1,
Gain_thresh2)
P_curr = P_atram − P_hydro;
P_target_low = P_setpt-P_band;      %Threshold for increasing pump gain
P_target_hi = P_setpt+P_band;       %Threshold for decreasing pump gain
% If operating above threshold, limit number of simultaneously activated pumps
if P_curr > P_thresh2
        Gain_max = Gain_thresh2;
elseif P_curr > P_thresh1
        Gain_max = Gain_thresh1;
end
% If at a gain threshold, determine whether to activate pumps based on pressure
differences from a target pressure
if Gain_curr == Gain_thresh1
        P_target_low = 0.5*P_thresh1;
elseif Gain_curr == Gain_thresh2
        P_target_low = 0.5*P_thresh2;
end
if Gain_curr < Gain_min
        Gain_out = Gain_min;
elseif Gain_curr > Gain_max
        Gain_out = Gain_max;
elseif (P_curr < P_target_low) && (Gain_curr < Gain_max)
        Gain_out = Gain_curr+1;
elseif (P_curr > P_target_hi) && (Gain_curr > Gain_min)
        Gain_out = Gain_curr-1;
else
        Gain_out = Gain_curr;
end
end
```

Similar control decisions may be made based on any suitable variables, such as, for example, temperature (e.g., of hydraulic fluid), current (e.g., through an auxiliary cable), and/or the like (e.g., in a monitor, compare, actuate fashion).

For further example, some of the present methods for controlling a plurality of motor-actuated subsea pumps (e.g., 14) comprise recording (e.g., with a processor or controller 178) a run-time of a first motor (e.g., 30) over a pre-determined period of time, and deactivating the first motor and activating a second motor if the recorded run-time exceeds a pre-determined threshold. Some of the present methods for controlling a plurality of motor-actuated subsea pumps comprise recording a number of motor activations of a first motor over a first pre-determined period of time and activating a second motor in lieu of the first motor during a second pre-determined period of time if the number of motor activations of the first motor over the first pre-determined period of time exceeds a pre-determined threshold. In some embodiments, a processor or controller (e.g., 178) is configured to avoid deactivating an activated motor (e.g., 30) for a first pre-determined period of time if a number of motor activations of the activated motor over a second pre-determined period of time exceeds a pre-determined threshold. In this way, some embodiments of the present subsea pumping apparatuses are configured to mitigate wear and tear on pumps 14 and/or motors 30.

For yet further example, in this embodiment, processor or controller 178 is configured to detect, based at least in part on the data captured by the one or more sensors 186, an abnormal operation associated with one or more components including at least one of the one or more pumps 14, at least one of the one or more motors 30, hydraulically actuated device, and blowout preventer, perform a diagnostic and/or prognostic analysis of the one or more components, and control the one or more components based at least in part on at least one of the detected abnormal operation and a result of the diagnostic and/or prognostic analysis (e.g., activate a second motor 30 and/or pump 14 based on an indication from one or more sensors 186 that a first motor 30 and/or pump 14 has and/or is failing).

In the embodiment shown, processor or controller 178 is configured to monitor and/or control components (e.g., pumps 14 and/or motors 30) to mitigate and/or compensate for hydraulic fluid leakage. For example, some of the present methods for controlling a pressure within a subsea hydraulic system (e.g., within subsea pumping apparatus 10d, a hydraulically actuated device, a blowout preventer, and/or the like) comprise determining an amount of hydraulic fluid leakage from the subsea hydraulic system (e.g., via processor or controller 178 monitoring of one or more sensors 186) and providing, with one or more subsea pumps (e.g., 14), an amount of hydraulic fluid to the subsea hydraulic system that substantially matches the amount of hydraulic fluid leakage (e.g., whether such fluid is provided subsea, such as, for example, via induction of sea water, subsea production of desalinated water, and/or the like, and/or provided from above sea, for example, via a rigid conduit, hot line, and/or the like).

In the embodiment shown, processor or controller 178 is configured to monitor and/or control the state of one or more batteries 110. For example, processor or controller 178 can be configured to load test one or more batteries, measure and/or control parameters associated with charging one or more batteries, estimate a time period before one or more batteries are discharged, and/or the like.

In the embodiment shown, processor or controller 178 is configured to electrically communicate with an above-sea control interface (e.g., to send and/or receive signals, data, commands, commands, and/or the like).

In the embodiment shown, subsea pumping apparatus 10d comprises a memory coupled to processor or controller 178 (e.g., forming a component of and/or integral with processor or controller 178, in this embodiment). Memories of the present pumping apparatuses can be configured to store any suitable information, such as, for example, information regarding diagnostic and/or prognostic operations, configuration files (e.g., for a subsea pumping apparatus, hydraulically actuated device, and/or a blowout preventer), historic (e.g., sensor) data, and/or the like.

Figure 9:
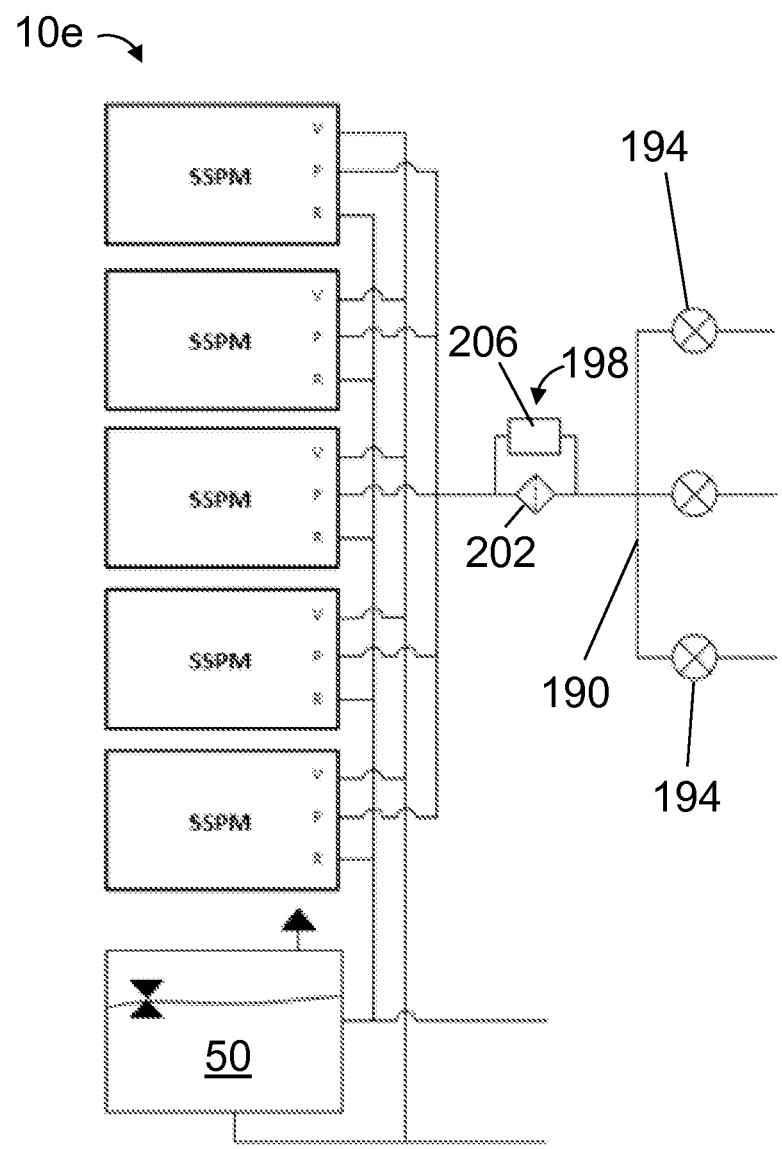
FIG. 9 is a diagram of a fifth embodiment of the present subsea pumping apparatuses.

FIG. 9 is a diagram of a fifth embodiment 10e of the present subsea pumping apparatuses. In the embodiment shown, pumping apparatus 10d comprises and/or is in fluid communication with a fluid rail 190 in fluid communication with an outlet 22 of at least one of pumps 14. In this embodiment, one or more valves 194 (e.g., relief valve(s), regulating valve(s), unloading valve(s), and/or the like) in fluid communication with fluid rail 190 can be configured to deliver hydraulic fluid from subsea pumping apparatus 10e to one or more hydraulically actuated device(s) of a blowout preventer at one or more pressures.

In the embodiment shown, pumping apparatus 10e comprises a filtering system 198 (e.g., comprising one or more filters 202) configured to filter the hydraulic fluid (e.g., to remove any contaminants and/or the like). In this embodiment, filtering system 198 comprises a bypass valve 206 configured to selectively divert fluid around at least a portion of the filtering system (e.g., if a portion of filtering system 198, such as a filter 202, becomes clogged and/or otherwise unsuitable for use).

The present pumping apparatuses can be configured as part of a redundant pressure system. For example, a first flow source can comprise a rigid conduit and/or hot line configured to provide hydraulic fluid to a hydraulically actuated device, a second flow source can comprise a subsea pumping apparatus (e.g., 10a, 10b, 10c, 10d, 10e, and/or the like) configured to provide hydraulic fluid to the hydraulically actuated device, and the first and second flow sources can be configured to simultaneously and/or selectively supply hydraulic fluid to the hydraulically actuated device.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A subsea pumping apparatus comprising:
two or more subsea pumps, each having an inlet and an outlet;
one or more motors, each configured to actuate at least one of the two or more pumps to communicate a hydraulic fluid from the inlet to the outlet; and
two or more valves, each in fluid communication with the outlet of at least one of the two or more pumps and configured to selectively route, when the valve is in a first position, hydraulic fluid from the outlet to a location selected from the group consisting of a subsea environment, a reservoir, and the inlet of one of the two or more pumps and configured to selectively route, when the valve is in a second position, hydraulic fluid from the outlet to the hydraulically actuated device, and not the location,
wherein at least one of the two or more valves is movable from the first position to the second position while at least one other of the two or more valves is in the first position,
wherein the subsea pumping apparatus is configured to be in direct fluid communication with a hydraulically actuated device of a blowout preventer; and
wherein the subsea pumping apparatus further comprises:
a control circuit including a valve controller in electrical communication with at least one of the two or more valves and configured to adjust an output of at least one of the two or more subsea pumps by selectively varying the position of at least one of the two or more valves between the first position and the second position; and
a sensor configured to capture data indicative of at least one of a flow rate or a pressure, thereby permitting the valve controller to vary the position of the at least one of the two or more valves based on the captured data;
wherein the valve controller is configured to receive data captured by the sensor and compare the data to one of a known, a calculated, or a commanded hydraulic fluid pressure and/or flow rate requirement;
wherein the valve controller, if the data indicates that the pressure and/or flow rate is lower than the known, calculated, and/or commanded hydraulic fluid pressure and/or flow rate requirement, is configured to adjust the pressure and/or flow rate upwards by varying the position of the at least one of the two or more valves; and
wherein the valve controller, if the data indicates that the pressure and/or flow rate is higher than the known, calculated, and/or commanded hydraulic fluid pressure and/or flow rate requirement, is configured to adjust the outlet pressure and/or flow rate downwards by varying the position of the at least one of the two or more valves.

2. The subsea pumping apparatus of claim 1, further comprising one or more hydraulic stabs, each in fluid communication with at least one of the one or more pumps.

3. The subsea pumping apparatus of claim 1, wherein the outlet of at least one of the two or more pumps is in fluid communication with the inlet of at least one other pump.

4. The subsea pumping apparatus of claim 1, wherein at least one of the one or more motors is configured to actuate at least two of the two or more pumps.

5. The subsea pumping apparatus of claim 1, wherein at least one of the one or more motors is coupled to at least one of the two or more pumps via a gear box.

6. The subsea pumping apparatus of claim 1, wherein at least one of the one or more motors is directly coupled to at least one of the two or more pumps such that neither a shaft seal of the at least one of the one or more motors nor a shaft seal of the at least one of the two or more pumps is exposed to the subsea environment.

7. The subsea pumping apparatus of claim 1, the control circuit comprising one or more motor controllers, each motor controller in electrical communication with at least one of the one or more motors and configured to selectively adjust a speed of the at least one of the one or more motors.

8. The subsea pumping apparatus of claim 7, wherein at least one of the one or more motor controllers is configured to adjust a speed of at least one of the one or more motors by selectively activating and deactivating the at least one of the one or more motors.

9. The subsea pumping apparatus of claim 1, comprising one or more sensors coupled to the subsea pumping apparatus and configured to capture data indicative of at least one of temperature, conductivity, pH, position, velocity, acceleration, current, and voltage.

10. The subsea pumping apparatus of claim 9, comprising a processor configured to control, based at least in part on the data captured by the one or more sensors, actuation of at least one of: at least one of the one or more motors and at least one of the two or more pumps.

11. The subsea pumping apparatus of claim 10, wherein the processor is configured to:
detect, based at least in part on the data captured by the one or more sensors, an abnormal operation associated with one or more components including at least one of: at least one of the two or more pumps, at least one of the one or more motors, hydraulically actuated device, and blowout preventer;
perform a diagnostic analysis of the one or more components; and
control the one or more components based at least in part on at least one of the detected abnormal operation and a result of the diagnostic analysis.

12. The subsea pumping apparatus of claim 1, comprising one or more batteries coupled to the subsea pumping apparatus and configured to provide electrical power to at least one of the one or more motors.

13. The subsea pumping apparatus of claim 1, further comprising a processor configured to receive data captured by the sensor;
wherein the processor is configured to detect, based at least in part on the data captured by the sensor, an abnormal operation associated with one or more components including at least one of the two or more subsea pumps, at least one of the one or more motors, the hydraulically actuated device, and the blowout preventer;
wherein the processor is configured to perform a diagnostic and/or prognostic analysis of at least one of the one or more components; and
wherein the processor is configured to control at least one of the one or more components based at least in part on at least one of the detected abnormal operation and a result of the diagnostic and/or prognostic analysis.

* * * * *